United States Patent
Katsura et al.

(10) Patent No.: US 6,639,997 B1
(45) Date of Patent: Oct. 28, 2003

(54) APPARATUS FOR AND METHOD OF EMBEDDING AND EXTRACTING DIGITAL INFORMATION AND MEDIUM HAVING PROGRAM FOR CARRYING OUT THE METHOD RECORDED THEREON

(75) Inventors: Takashi Katsura, Fukuoka (JP); Hisashi Inoue, Fukuoka (JP)

(73) Assignee: Matsushita Electric Industrial Co., Ltd., Osaka-fu (JP)

(*) Notice: Subject to any disclaimer, the term of this patent is extended or adjusted under 35 U.S.C. 154(b) by 0 days.

(21) Appl. No.: 09/496,661

(22) Filed: Feb. 3, 2000

(30) Foreign Application Priority Data

Feb. 15, 1999 (JP) .............................. 11-035335

(51) Int. Cl.[7] .............................................. G06K 9/00
(52) U.S. Cl. .................. 382/100; 713/186; 381/94.2
(58) Field of Search ................... 382/100, 232, 382/183, 284, 115, 278; 715/500; 713/186, 168, 176; 707/3; 709/217; 375/240.1; 380/210, 201, 202, 54, 28; 381/94.2

(56) References Cited

U.S. PATENT DOCUMENTS

| | | |
|---|---|---|
| 5,848,155 A | 12/1998 | Cox |
| 5,915,027 A | 6/1999 | Cox et al. |
| 2002/0071593 A1 * | 6/2002 | Muratani ..................... 382/100 |
| 2003/0012444 A1 * | 1/2003 | Inoue et al. ................. 382/232 |
| 2003/0026447 A1 * | 2/2003 | Fridrich et al. ............. 382/100 |
| 2003/0035553 A1 * | 2/2003 | Baumgarte et al. ........ 381/94.2 |
| 2003/0037075 A1 * | 2/2003 | Hannigan et al. ........... 707/500 |

FOREIGN PATENT DOCUMENTS

| | | |
|---|---|---|
| EP | 0 766 468 | 4/1997 |
| EP | 0 840 513 | 5/1998 |
| EP | 0 891 071 | 1/1999 |
| JP | 9-191394 | 7/1997 |
| JP | 10-145757 | 5/1998 |
| JP | 10-308867 | 11/1998 |
| WO | 99/01980 | 1/1999 |

OTHER PUBLICATIONS

Onishi et al.: "A Method of Watermarking with Multiresolution Analysis and Pseudo Noise Sequences", Systems & Computers in Japan, Scripta Technica Journals, New York, U.S., vol. 29, No. 5, (Nov. 1997), pp. 3020–3028, XP000668963, ISSN: 0882–1666, the whole document.

* cited by examiner

Primary Examiner—Jayanti K. Patel
Assistant Examiner—Barry Choobin
(74) Attorney, Agent, or Firm—Wenderoth, Lind & Ponack L.L.P.

(57) ABSTRACT

An object of the present invention is to provide a simple apparatus for and a simple method of embedding and extracting digital information with little clue to a third party as to embedded digital information with less effort, and the embedded information is securely reconstructed thereby.

To embed digital information, a band division portion receives a digital image signal, and then divides the same into ten frequency band signals through discrete wavelet transform so as to compute wavelet coefficients. A mapping portion maps inherent digital information to a pseudo-random number string. An information embedding portion embeds the mapped pseudo-random number string in a string structured by every or some of the computed wavelet coefficients in MRR (signals exclusive of an LL3 signal). A band synthesis portion synthesizes the embedded LL3 digital image signal. To extract the digital information, the band division portion divides a digital image signal to which information has been embedded into a plurality of frequency bands, and then computes wavelet coefficients therein.

48 Claims, 9 Drawing Sheets

F I G. 1 0  PRIOR ART

APPARATUS FOR AND METHOD OF EMBEDDING AND EXTRACTING DIGITAL INFORMATION AND MEDIUM HAVING PROGRAM FOR CARRYING OUT THE METHOD RECORDED THEREON

BACKGROUND OF THE INVENTION

1. Field of the Invention

The present invention relates to an apparatus for and a method of embedding and extracting digital information, and a medium having a program for carrying out the method recorded thereon, more particularly to, for copyright protection, an apparatus for and a method of embedding digital data such as copyright information in an image signal and extracting the same, and a medium having a program for carrying out the method recorded thereon.

2. Description of the Background Art

In recent years, developments in digital technology accelerate digitalization of multimedia data including audio, image and video. The digitalized multimedia data has been getting popular through high-speed transmission in volume. Such multimedia data, however, is easy to duplicate and hence any unauthorized person is free to duplicate copyrighted digital images for secondary utilization.

To get around such problem, an electron (digital) watermark technique is applied. The digital watermarking is a technique for embedding digital information in image data in an insensible form for human being. With such digital watermark technique, a copyright holder can claim that his/her copyright is illegally used by extracting embedded information as a proof.

The conventional digital watermark technique includes a method disclosed in Japanese Patent Laying-Open No.9-191394 (hereinafter, referred to as first document). The first document proposes a method of embedding, according to normal or random distribution, an embedding value in a key component for image quality after spectrum decomposition is done on data. More specifically, in the first document, embedment is done with an equation (1) and extraction with an equation (2), where Wi is a pseudo-random number string (embedding value), fi is a frequency coefficient of before-watermarking data, fi' is a frequency coefficient of after-watermarking data, and α is a scaling parameter.

$$f_i' = f_i + \alpha f_i W_i \quad (1)$$

$$W_i = \frac{f_i' - f_i}{\alpha f_i} \quad (2)$$

Although the method advantageously renders the embedding value difficult to eliminate, it does not store positional information on the frequency coefficient into which the embedding value is inserted. To extract the embedding value, the method accordingly requires before-embedding original data.

Differently, Japanese Patent Laying-Open No.10-308867 (hereinafter, second document) discloses a method which does not require original data. In the second document, embedment is done with an equation (3) and extraction with (4), where avg(fi) is a partial average of the frequency coefficient fi of before-watermarking data.

$$f_i' = f_i + \alpha avg(f_i) W_i \quad (3)$$

$$\frac{f_i'}{avg(f_i')} = \frac{f_i + \alpha avg(f_i) W_i}{avg(f_i')} \quad (4)$$
$$= \frac{f_i}{avg(f_i')} + \alpha W_i \approx \alpha W_i \quad (\because avg(f_i) = avg(f_i'))$$

The equation (4) having no fi on the right part thereof indicates that there is no more need for the original data. However, the method is still required to perform DCT (Discrete Cosine Transform) and compute the reciprocal of the partial average of data. In this manner, applying such method to data in volume like image data results in great computation effort.

For betterment, another method is disclosed in Japanese Patent Laying-Open No.10-145757 (hereinafter, third document).

In the third document, embedment is done with an equation (5) and extraction with an equation (6), where |fi| is an absolute value of the frequency coefficient fi of before-watermarking data.

$$f_i' = f_i + \alpha avg(f_i) W_i \quad (5)$$

$$\frac{f_i'}{avg(|f_i'|)} = \frac{f_i + \alpha avg(|f_i|) W_i}{avg(|f_i'|)} \quad (6)$$
$$= \frac{f_i}{avg(|f_i'|)} + \alpha W_i \approx \alpha W_i \quad (\because avg(|f_i'|) = avg(|f_i'|))$$

For the purpose of reducing the effort great in the second document, the pseudo-random number string (embedding value) is first divided into several units, and then each unit of numbers is subjected to watermarking. When each unit is 8 by 8 in size, this method can be carried out by utilizing the procedure of MPEG, which is a manner of encoding moving images. In this manner, computational complexity accordingly gets lower, but the method is still required to compute the reciprocal of the partial average of data and great in computation effort.

The method in the third document is relevant to MPEG. Described below are methods of embedding (inserting) and extracting an embedding value disclosed in the second document.

First, the method of embedding is described by referring to FIG. 10. An embedding signal first goes through an error correction encoder 81, secondly through a spread spectrum modulator 82, and lastly through a first spectrum transformer 83 and reaches a spectrum shaping device 84 as a first input. On the other hand, before-watermarking data is provided to a second spectrum transformer 85. An output of the second spectrum transformer 85 is partially averaged temporally or spatially in a partial averaging device 86 before provided to the spectrum shaping device 84 as a second input, and is also provided to a delaying device 87. An output of the spectrum shaping device 84 is added to that of the delaying device 87 in an adder 88. An output of the adder 88 is inversely-transformed in an inverse transformer 89, and thus data is watermarked.

Next, the method of extracting is described by referring to FIG. 11. A spectrum normalization unit 91 receives the watermarked data and then subjects the data to spectrum normalization so as to put the data back to a state before watermarking. Then, the normalized signal is analyzed in correlators 92A to 92Z. The correlators 92A to 92Z each detects a specific pseudo-random number sequence in the signal, if any, correlates the normalized signal to the pseudo-random number sequence, and then provides an output indicating a degree of the correlation therebetween to a judgment circuit 93. The judgement circuit 93 sequentially selects an output being maximum as a most-probable current symbol among current symbols received from the correlators. Further, a sequence of the selected maximum likelihood current symbol is provided to the error corrector 94 so as to correct any error in the judgement made in the judgement circuit 93. In this manner, the embedding signal is extracted as an output of the error corrector 94.

To eliminate the need for original data, the method in the foregoing results in another need for a partial average to embed an embedding signal and for spectrum shaping by using the partial average. Further, to extract the embedding signal, there is still another need for spectrum normalization to put the embedding signal back to a state before watermarking. In a practical manner, the reciprocal of the partial average is computed. Still further, the method requires a plurality of correlators for extraction, and is required to correct errors at the end. Accordingly, the method bears a problem of great computation effort for extraction.

SUMMARY OF THE INVENTION

Therefore, in view of the above problems, an object of the present invention is, with the help of simple spectrum transformation for embedding and an inner product computed for extraction, to provide an apparatus for and a method of embedding and extracting digital information, in a simplified manner with less effort, with little clue to a third party as to the embedded digital information, and a medium on which a program for carrying out the method is recorded.

The present invention has the following features to achieve the object above.

A first aspect of the present invention is directed to a digital information embedding/extracting apparatus of a type embedding inherent digital information in a digital image signal, the apparatus comprising:

a band division portion for dividing the digital image signal into coefficients in a plurality of frequency bands through discrete wavelet transform or sub-band division;

a mapping portion for mapping the inherent digital information to a pseudo-random number string;

an information embedding portion for embedding the pseudo-random number string in a string structured by the coefficients in every or some of the divided frequency bands exclusive of a lowest frequency band referred to as MRA (hereinafter, referred to as MRR); and a band synthesis portion for reconstructing the digital image signal in which the pseudo-random number string has been embedded by using the MRR and the MRA to which information embedding processing is subjected.

As described above, in the first aspect, inherent digital information can be embedded without causing image degradation or necessitating positional information thereof.

A second aspect of the present invention is directed to a digital information embedding/extracting apparatus of a type extracting inherent digital information embedded in a digital image signal, the apparatus comprising:

a band division portion (11) for receiving a reconstructed digital image signal obtained by dividing said digital image signal through discrete wavelet transform or sub-band division and by embedding a pseudo-random number string in a string structured by coefficients in every or some of a plurality of frequency bands exclusive of a lowest frequency band referred to as MRA (hereinafter, referred to as MRR), and then dividing the reconstructed digital image signal into coefficients in a plurality of frequency bands through discrete wavelet transform or sub-band transform;

a correlation value computation portion for computing an inner product of the string structured by the coefficients in the MRR among the divided frequency bands and a predetermined pseudo-random number assumed to be embedded;

a pseudo-random number string determination portion for determining the pseudo-random number string embedded in the digital image signal according to the value computed by the correlation value computation portion; and an information extraction portion for extracting the inherent digital information mapped to the determined pseudo-random number string.

As described above, in the second aspect, embedded inherent digital information can be extracted in a simplified structure.

According to third and fourth aspects of the present invention, in the first and second aspects, respectively, the pseudo-random number string is structured by numbers selected from normally-distributed average values of "0" and distribution values of "1".

As described above, in the third and fourth aspects, a pseudo-random number string can be easily generated in an arbitrary length, whereby an embedding apparatus can be in a simplified structure. Further, since numbers in a string are totaled to be 0 if the string is long enough, a correlation peak value can be specified by computing an inner product. In this manner, an extracting apparatus in a simplified structure can be realized.

According to fifth and sixth aspects of the present invention, in the second and fourth aspects, respectively, when the value computed by the correlation value computation portion is larger than a predetermined threshold value, the pseudo-random number string determination portion determines that pseudo-random number string which embedded in the string structured by the coefficients in the MRR is positively identified as being the pseudo-random number string.

As described above, in the fifth and sixth aspects, determination is made only by comparing an output value of the correlation value computation portion with a predetermined threshold value. Therefore, an extracting apparatus can be in a simplified structure.

According to seventh and eighth aspects of the present invention, in the first and third aspects, respectively, on dividing the digital image signal into the coefficients in the plurality of frequency bands, the band division portion divides the digital image signal into a plurality of hierarchies, and the information embedding portion embeds the pseudo-random number string in a string structured by every or some of the coefficients in a second or higher hierarchies in the MRR among the divided frequency bands.

According to ninth to twelfth aspects of the present invention, in the first, third, seventh and eighth aspect, respectively, among the MRR, the information embedding portion embeds the pseudo-random number string in a string structured by every or some of coefficients in a region high in a horizontal frequency component and low in a vertical frequency component (HL region), and by every or some of coefficients in a region low in the horizontal frequency component and high in the vertical frequency component (LH region).

According to thirteenth to sixteenth aspects of the present invention, in the first, third, seventh and eighth aspects, respectively, among the MRR, the information embedding portion embeds the pseudo-random number string in a string structured by every or some of coefficients in either an HL region or an LH region.

As described above, in the seventh to sixteenth aspects, embedded digital information can be retained even if the information is subjected to processing of cutting high frequency regions such as encoding.

A seventeenth aspect of the present invention is directed to a method of embedding/extracting digital information of a type embedding inherent digital information in a digital image signal, the method comprising the steps of:

dividing the digital image signal into coefficients in a plurality of frequency bands through discrete wavelet transform or sub-band division;

mapping the inherent digital information to a pseudo-random number string;

embedding the pseudo-random number string in a string structured by the coefficients in every or some of the divided frequency bands exclusive of a lowest frequency band referred to as MRA (hereinafter, referred to as MRR); and reconstructing the digital image signal in which the pseudo-random number string has been embedded by using the MRR and the MRA to which information embedding processing is subjected.

As described above, in the seventeenth aspect, inherent digital information can be embedded without causing image degradation or necessitating positional information thereof.

An eighteenth aspect of the present invention is directed to a method of embedding/extracting digital information of a type extracting inherent digital information embedded in a digital image signal, the method comprising the steps of:

receiving a reconstructed digital image signal obtained by dividing said digital image signal through discrete wavelet transform or sub-band division and by embedding a pseudo-random number string in a string structured by coefficients in every or some of a plurality of frequency bands exclusive of a lowest frequency band referred to as MRA (hereinafter, referred to as MRR), and then dividing the reconstructed digital image signal into coefficients in a plurality of frequency bands through discrete wavelet transform or sub-band transform;

computing an inner product of the string structured by the coefficients in the MRR among the divided frequency bands and a predetermined pseudo-random number assumed to be embedded;

determining the pseudo-random number string embedded in the digital image signal according to the computed inner product; and generating the inherent digital information mapped to the determined pseudo-random number string.

As described above, in the eighteenth aspect, embedded inherent digital information can be extracted in a simplified structure.

According to nineteenth and twentieth aspects, in the seventeenth and eighteenth aspects, respectively, the pseudo-random number string is structured by numbers selected from normally-distributed average values of "0" and distribution values of "1".

As described above, in the nineteenth and twentieth aspects, a pseudo-random number string can be easily generated in an arbitrary length, whereby an embedding apparatus can be in a simplified structure. Further, since numbers in a string are totaled to be 0 if the string is long enough, a correlation peak value can be specified by computing an inner product. In this manner, an extracting apparatus in a simplified structure can be realized.

According to twenty-first and twenty-second aspects of the present invention, in the eighteenth and twentieth aspects, respectively, when the computed inner product is larger than a predetermined value, in the pseudo-random number string determination step, pseudo-random number string which embedded in the string structured by the coefficients in the MRR is positively determined as being the pseudo-random number string.

As described above, in the twenty-first and twenty-second aspects, determination is made only by comparing an inner product obtained through computation with a predetermined threshold value. Therefore, an extracting apparatus in a simplified structure can be realized.

According to twenty-third and twenty-fourth aspects of the present invention, in the seventeenth and nineteenth aspect, respectively, in the band division step, the digital image signal is divided into a plurality of hierarchies when being divided into coefficients in a plurality of frequency bands, and in the pseudo-random number string embedding step, the pseudo-random number string is embedded in a string structured by every or some of the coefficients in a second or higher hierarchies in the MRR among the divided frequency bands.

According to twenty-fifth to twenty-eighth aspects of the present invention, in the seventeenth, nineteenth, twenty-third and twenty-fourth aspects, respectively, in the pseudo-random number string embedding step, among the MRR, the pseudo-random number string is embedded in a string structured by every or some of coefficients in an HL region, and by every or some of coefficients in an LH region.

According to twenty-ninth to thirty-second aspects of the present invention, in the seventeenth, nineteenth, twenty-third and twenty-fourth aspects, respectively, in the pseudo-random number string embedding step, among the MRR, the pseudo-random number string is embedded in a string structured by every or some of coefficients in either a region high in a horizontal frequency component and low in a vertical frequency component (HL region) or a region low in the horizontal frequency component and high in the vertical frequency component (LH region).

As described above, in the twenty-third to thirty-second aspects, respectively, embedded digital information can be retained even if the information is subjected to processing of cutting high frequency regions such as encoding.

A thirty-third aspect of the present invention is directed to a recording medium on which a program to be run in a computer device is recorded, the program being for realizing in the computer device an operational environment comprising the steps of:

dividing a digital image signal into coefficients in a plurality of frequency bands through discrete wavelet transform or sub-band division;

mapping inherent digital information to a pseudo-random number string;

embedding the pseudo-random number string in a string structured by coefficients in every or some of the divided frequency bands exclusive of a lowest frequency band referred to as MRA (hereinafter, referred to as MRR); and reconstructing the digital image signal in which the pseudo-random number string has been embedded by using the MRR and the MRA to which information embedding processing is subjected.

A thirty-fourth aspect of the present invention is directed to a recording medium on which a program to be run in a computer device is recorded, the program being for realizing an operational environment in the computer device comprising the steps of:

receiving a reconstructed digital image signal obtained by dividing said digital image signal through discrete wavelet transform or sub-band division and by embedding a pseudo-random number string in a string structured by coefficients in every or some of a plurality of frequency bands exclusive of a lowest frequency band referred to as MRA (hereinafter, referred to as MRR), and then dividing the reconstructed digital image signal into coefficients in a plurality of frequency bands through discrete wavelet transform or sub-band transform;

computing an inner product of the string structured by the coefficients in the MRR among the divided frequency bands and a predetermined pseudo-random number assumed to be embedded;

determining the pseudo-random number string embedded in the digital image signal according to the computed inner product; and generating the inherent digital information mapped to the determined pseudo-random number string.

According to thirty-fifth and thirty-sixth aspects of the present invention, in the thirty-third and thirty-fourth aspects, respectively, the pseudo-random number string is structured by numbers selected from normally-distributed average values of "0" and distribution values of "1".

According to thirty-seventh and thirty-eighth aspect, in the thirty-fourth and thirty-sixth aspect, when the computed inner product is larger than a predetermined value, in the pseudo-random number string determination step, pseudo-random number string which embedded in the string structured by the coefficients in the MRR is positively determined as being the pseudo-random number string.

According to thirty-ninth and fortieth aspect, in the thirty-third and thirty-fifth aspects, in the band division step, the digital image signal is divided into a plurality of hierarchies when being divided into coefficients in a plurality of frequency bands, and in the pseudo-random number string embedding step, the pseudo-random number string is embedded in a string structured by every or some of the coefficients in a second or higher hierarchies in the MRR among the divided frequency bands.

According to forty-first to forty-fourth aspects, in the thirty-third, thirty-fifth, thirty-ninth and fortieth aspects, respectively, in the pseudo-random number string embedding step, among the MRR, the pseudo-random number string is embedded in a string structured by every or some of coefficients in an HL region, and by every or some of coefficients in an LH region.

According to a forty-fifth to a forty-eighth aspects, in the thirty-third, thirty-fifth, thirty-ninth and fortieth aspects, respectively, in the pseudo-random number string embedding step, among the MRR, the pseudo-random number string is embedded in a string structured by every or some of coefficients in either an HL region or an LH region.

As described above, the thirty-third to forty-eighth aspects are directed to a recording medium on which a program for carrying out the method of embedding and extracting digital information in the seventeenth to thirty-second aspects is recorded. The recording medium is to provide the method of embedding and extracting digital information in the seventeenth to thirty-second aspects to any existing apparatus as a software.

These and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1:
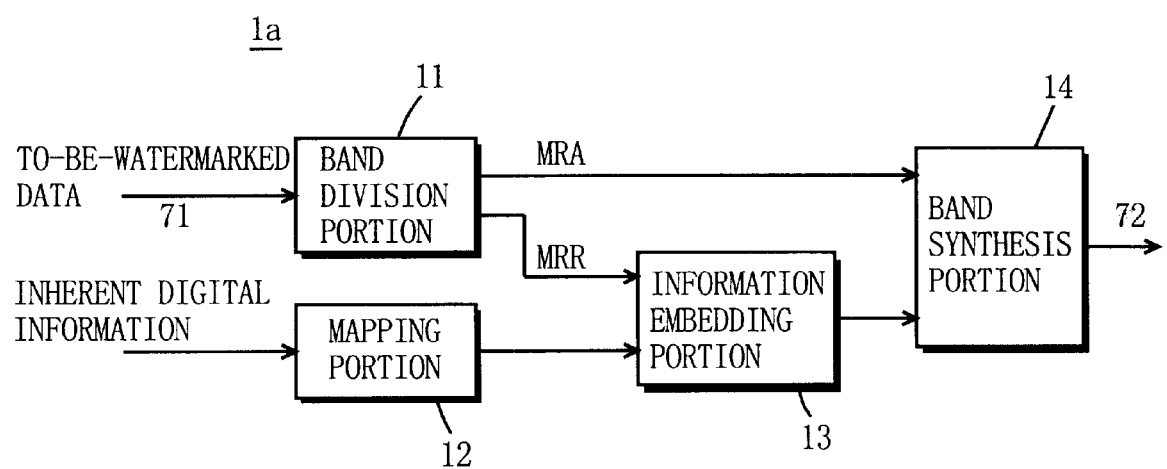
FIG. 1 is a block diagram showing the structure of a digital information embedding apparatus 1a according to a first embodiment of the present invention.

FIG. 1 is a block diagram showing the structure of a digital information embedding apparatus according to a first embodiment of the present invention. In FIG. 1, the digital information embedding apparatus 1a is provided with a band division portion 11, a mapping portion 12, an information embedding portion 13, and a band synthesis portion 14.

Hereinafter, it is stepwise described how the digital information embedding apparatus 1a is operated by further referring to FIGS. 2 to 7.

Figure 2:
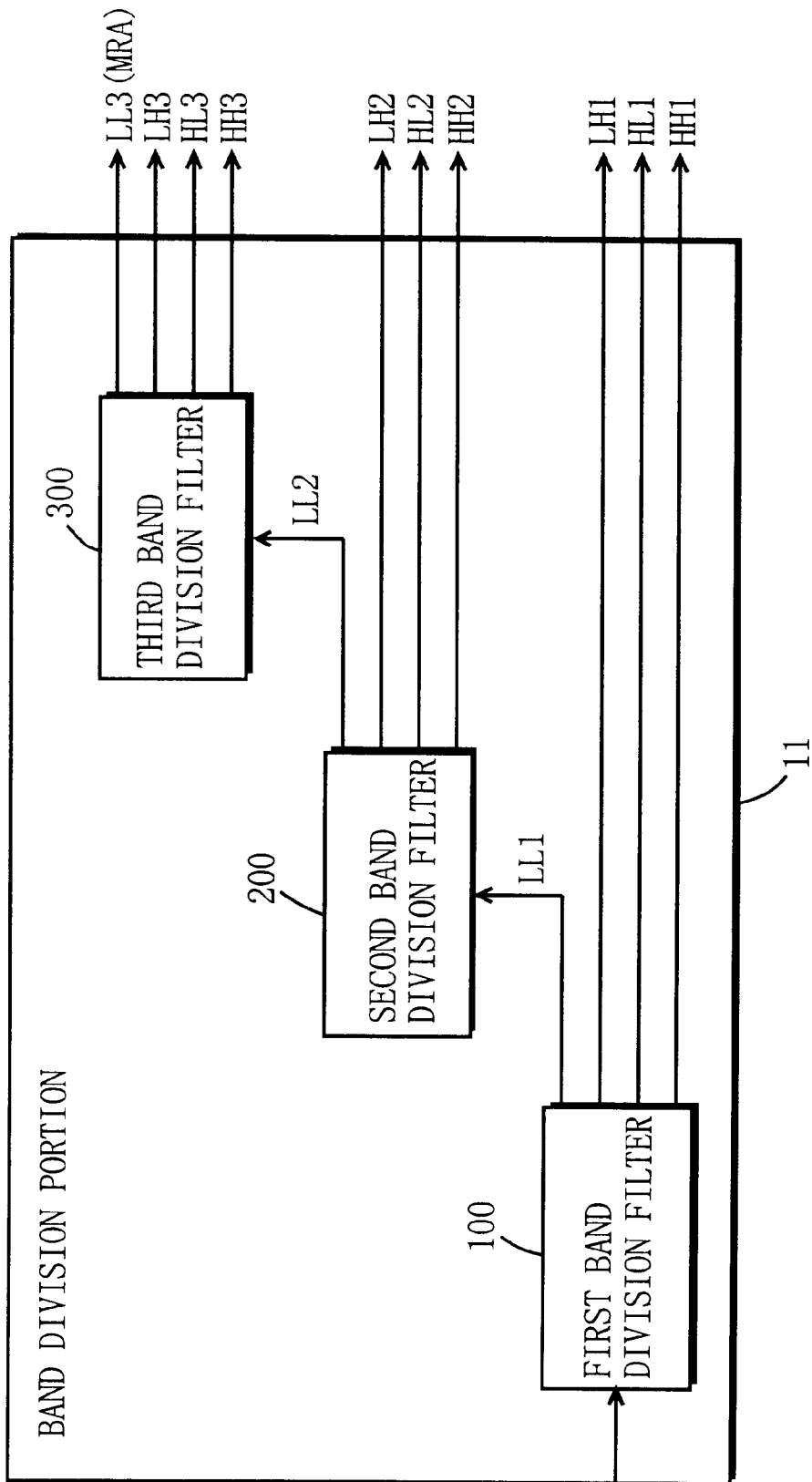
FIG. 2 is a block diagram exemplarily showing the detailed structure of a band division portion 11 in FIG. 1.
Figure 3:
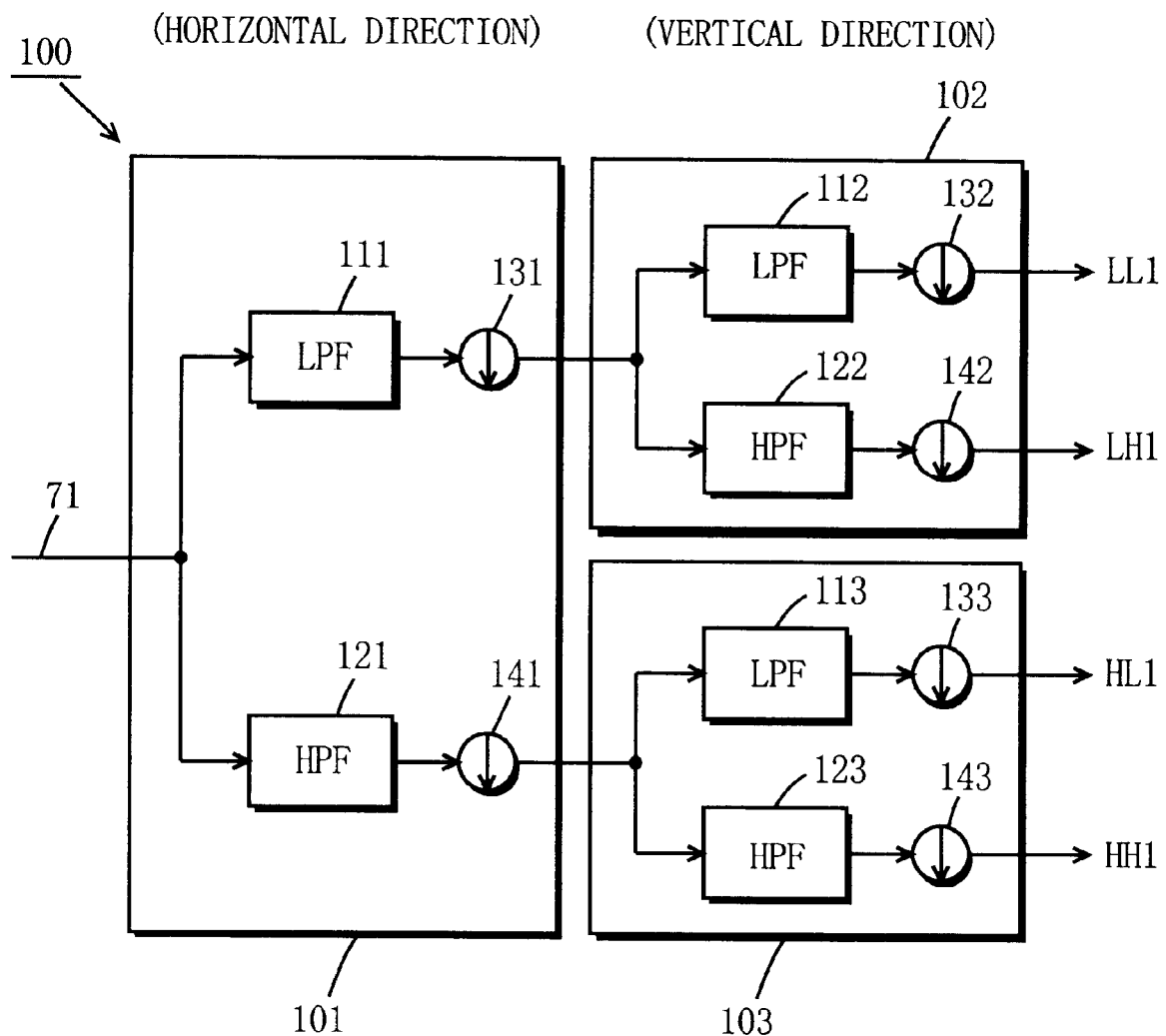
FIG. 3 is a block diagram exemplarily showing the detailed structure of a first band dividing filter 100 in FIG. 2.
Figure 4:
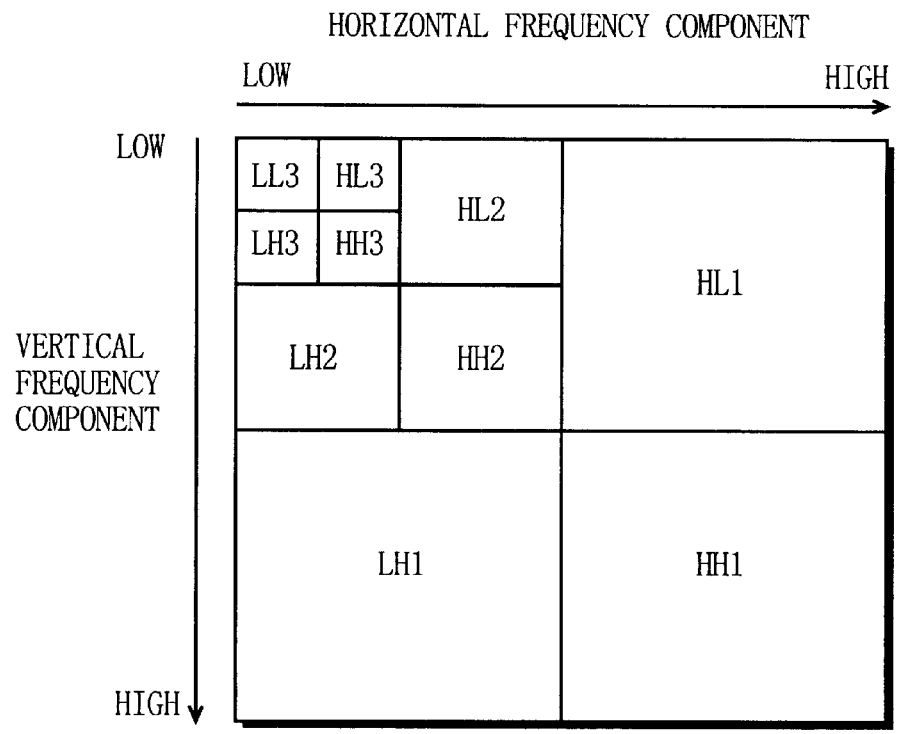
FIG. 4 is a diagram illustrating, in a two-dimensional frequency region, signals subjected to discrete wavelet transform by the band division portion 11 in FIG. 1.

First, by referring to FIGS. 2 to 4, it is described how a signal is subjected to discrete wevelet transform in the band division portion 11. After the transform, a band thereof is hierarchically divided into three. FIG. 2 is a block diagram exemplarily showing the detailed structure of the band division portion 11 in FIG. 1. In FIG. 2, the band division portion 11 is provided with first to third band dividing filters 100, 200 and 300, all of which are equal in structure. By going through each of the first to third band dividing filters 100, 200 and 300, an image signal is divided into four frequency bands, and wavelet coefficients are then determined for every frequency band. Also, as to coefficients, sub-band division will do.

The band division portion 11 first receives a digital image signal 71 in the first band dividing filter 100. Therein, the digital image signal 71 is divided into four signals varied in bands, i.e., an LL1 signal, LH1 signal, HL1 signal, and HH1 signal (hereinafter, referred collectively to as first hierarchical signal) on the basis of parameters of horizontal and vertical frequency components. The second band dividing filter 200 receives only the LL1 signal in the lowest band, and then again divides the signal into four signals varied in bands, i.e., an LL2 signal, LH2 signal, HL2 signal, and HH2 signal (hereinafter, referred collectively to as second hierarchical signal). Then, the third band dividing filter 300 receives only the LL2 signal in the lowest band, and then again divides the signal into four signals varied in bands, i.e., an LL3 signal, LH3 signal, HL3 signal, and HH3 signal (hereinafter, referred collectively to as third hierarchical signal).

FIG. 3 is a block diagram exemplarily showing the detailed structure of the first band dividing filter 100 in FIG. 2. In FIG. 3, the first band dividing filter 100 is provided with first to third two-band division portions 101 to 103. These first to third two-band division portions 101 to 103 are each provided with one-dimensional low-pass filters (LPF) 111 to 113, one-dimensional high-pass filters (HPF) 121 to 123, and down-samplers 131 to 133 and 141 to 143 for decimating the signal at a ratio of 2:1.

The first two-band division portion 101 receives the digital image signal 71, filters any horizontal component thereof through both the LPF 111 and HPF 121, and then outputs two signals. Thereafter, the first two-band division portion 101 decimates the filtered signals at a rate of 2:1, respectively, by using the downsampler 131 and 141, and then outputs the signals to the next stage. The second two-band division portion 102 receives the signal from the downsampler 131, and then filters any vertical component thereof through both the LPF 112 and HPF 122. Thereafter, the second two-band division portion 102 decimates the filtered signals at a rate of 2:1, respectively, by using the downsamplers 132 and 142, and then outputs two signals as LL1 and LH1. The third two-band division portion 103 receives the signal from the downsampler 141, and then filters any vertical frequency component thereof through both the LPF 113 and HPF 123. Then, the third two-band division portion 103 decimates the signals at a rate of 2:1, respectively, by using the downsamplers 133 and 143, and then outputs two signals as HL1 and HH1.

In this manner, the first band dividing filter 100 outputs four signals, i.e., the LL1 signal low in both horizontal and vertical components, the LH1 signal low in horizontal but high in vertical, the HL1 signal high in horizontal but low in vertical, and the HH1 signal high in both. The four signals are, in other words, wavelet coefficients. The second and third band dividing filters 200 and 300 treat any incoming signal in a similar manner to the above.

After going through the first to third band dividing filters 100, 200 and 300, the digital image signal 71 is divided into 10 band signals, i.e., LL3, LH3, HL3, HH3, LH2, HL2, HH2, LH1, HL1, and HH1.

FIG. 4 is a diagram illustrating these ten band signals in a two-dimensional frequency region. In FIG. 4, the vertical axis represents a vertical frequency component, which increases as is directed downward, and the horizontal axis represents a horizontal frequency component, which increases as is directed rightward. Each area in FIG. 4 is data serving as one image, and a ratio of area sizes is equivalent to that of the number of data in the band signals. In detail, in a case where the number of data in the LL3, LH3, HL3, and HH3 being the third hierarchical signals is "1", the number of data in the LH2, HL2 and HH2 being the second hierarchical signals is "4", and the number of data in the LH1, HL1 and HH1 being the first hierarchical signals is "16".

Next, it is described how the mapping portion 12 is operated. The mapping portion 12 generates a pseudo-random number string corresponding to inherent digital information. The pseudo-random number string is generated by randomly selecting numbers from a population constituted by normally-distributed average values of "0" and distribution values of "1". It is preferable if the mapping portion 12 is set to select a pseudo-random number string unique to the inherent digital information. Herein, the mapping portion 12 stores a table showing the correspondence between the inherent digital information and the pseudo-random number string. In a case where the inherent digital information is information on a copyright holder including his/her name and the date and time of creation of works, the table shows the correspondence between such information and the pseudo-random number string. The table is structured not to include any identical pseudo-random number string. Accordingly, on receiving any inherent digital information, e.g., information on a copyright holder, the mapping portion 12 refers to the table to output a pseudo-random number string.

Figure 5:
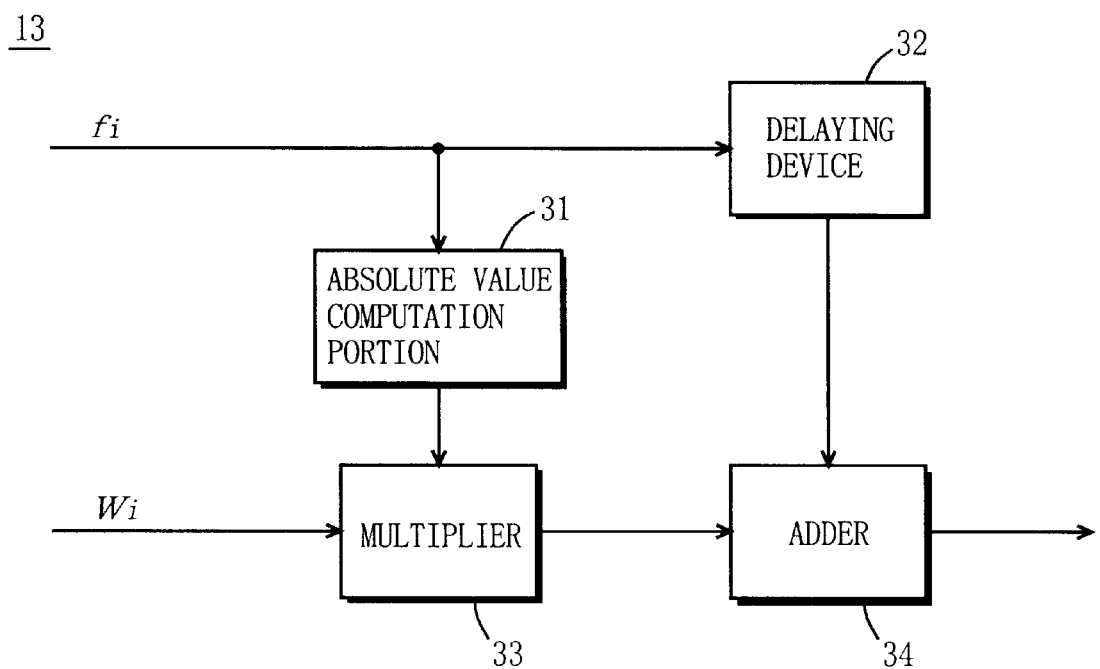
FIG. 5 is a block diagram exemplarily showing the detailed structure of an information embedding portion 13 in FIG. 1.

Next, by referring to FIG. 5, it is described how the information embedding portion 13 is operated. FIG. 5 is a block diagram exemplarily showing the detailed structure of the information embedding portion 13 in FIG. 1. In FIG. 5, the information embedding portion 13 is provided with an absolute value computation portion 31, a delaying device 32, a multiplier 33, and an adder 34.

The information embedding portion 13 reads the wavelet coefficients of the LH2 signal in FIG. 2 in a predetermined order from MRR of the signal divided in the band division portion 11, and then provides the same to the absolute value computation portion 31 and the delaying device 32. The absolute value computation portion 31 takes an absolute value of the received wavelet coefficients so as to output the same to the multiplier 33. The delaying device 32 has the received wavelet coefficients delayed so as to output the same to the adder 34. On the other hand, the pseudo-random number string Wi outputted from the mapping portion 12 is provided to the multiplier 33. The multiplier 33 multiplies the output of the absolute value computation portion 31 by the pseudo-random number string Wi, and then further multiplies the resultant value by the scaling parameter α. The adder 34 receives both outputs of the multiplier 33 and the delaying device 32, and then adds the outputs to output. In this example, the above-described processing can be expressed by an equation (7), where fi is the wavelet coefficient, |fi| is the absolute value of fi, Wi is the pseudo-random number string outputted from the mapping portion 12, and fi' is the wavelet coefficient subjected to embedment. Note that a herein is an integer smaller than 1.

$$f_i' + f_i + \alpha W_i \tag{7}$$

After the processing subjected to the wavelet coefficients of the LH2 signal is completed, the information embedding portion 13 reads the wavelet coefficients of the LH3 signal in a predetermined order, and then provides the same to the absolute value computation portion 31 and the delaying device 32. Thereafter, the processing is carried out in a similar manner to the wavelet coefficients of the LH2 signal. Note that, although the wavelet coefficients of the LH2 signal are treated before those of the LH3 signal in this example, the order may be inverted. Herein, the order in which the LH2 and LH3 signals are treated and the predetermined order for reading each wavelet coefficients thereof are both key information for extraction. The information is also used to extract inherent digital information.

Figure 6:
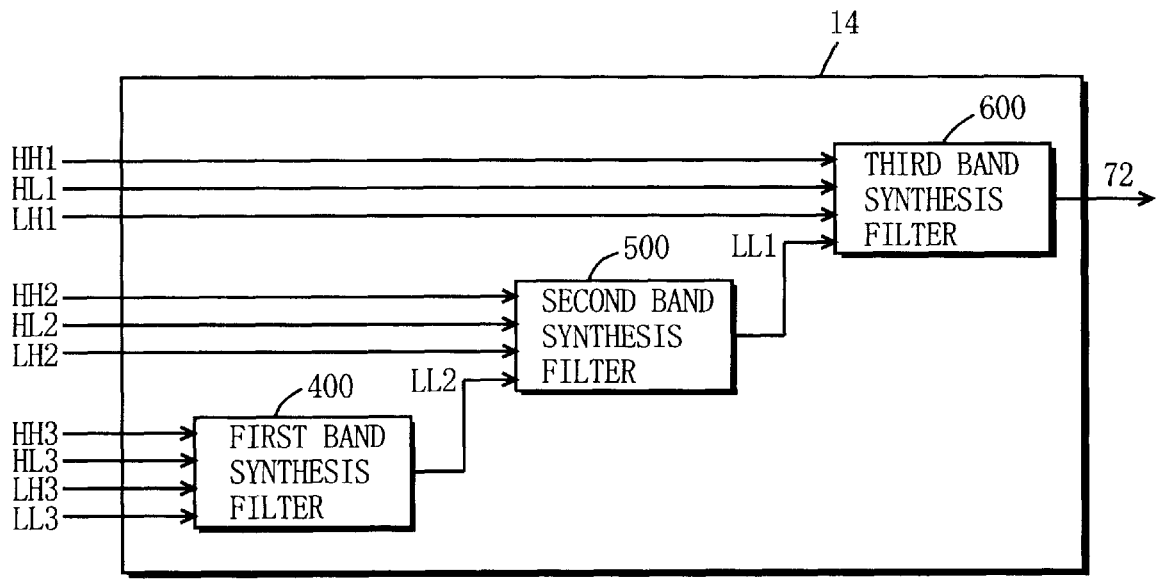
FIG. 6 is a block diagram exemplarily showing the detailed structure of a band synthesis portion 14 in FIG. 1.

Next, by referring to FIG. 6, it is described how the band synthesis portion 14 is operated. FIG. 6 is a block diagram exemplarily showing the detailed structure of the band synthesis portion 14 in FIG. 1. In FIG. 6, the band synthesis portion 14 is provided with first to third band synthesis filters 400, 500 and 600, all of which are equal in structure. These first to third band synthesis filters 400, 500 and 600 each receives four signals varied in frequency bands, and then synthesizes the signals to output as one signal.

The first band synthesis filter 400 receives the LL3 signal, HL3 and HH3 signals, and the LH3 signal in which the pseudo-random number string has been embedded, and then synthesizes these signals to generate the LL2 signal. The second band synthesis filter 500 receives the synthesized LL2 signal, the HL2 signal and the HH2 signal, and the LH2 signal in which the pseudo-random number string has been embedded, and then synthesizes these signals to generate the LL1 signal. Thereafter, the third band synthesis filter 600 receives the synthesized LL1 signal, and the HL1 signal, the HH1 signal and the LH1 signal, and then synthesizes these signals to reconstruct the digital image signal 72.

Figure 7:
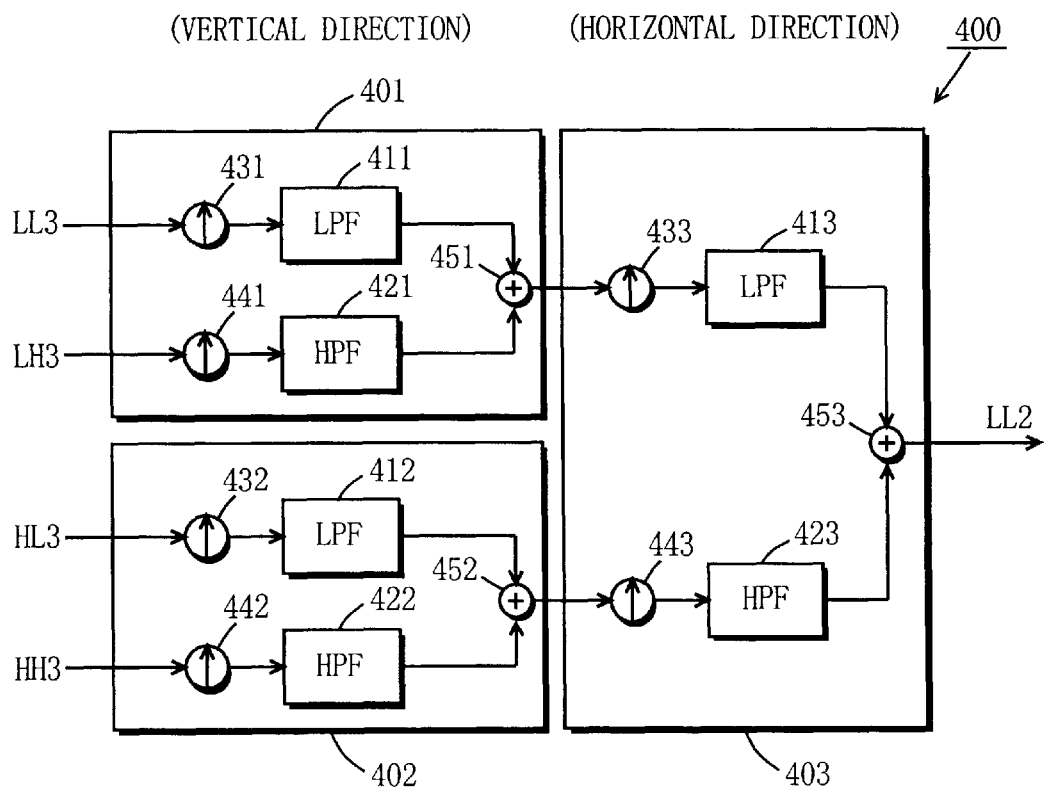
FIG. 7 is a block diagram exemplarily showing the detailed structure of a first band synthesis filter 400 in FIG. 6.

FIG. 7 is a block diagram exemplarily showing the detailed structure of the first band synthesis filter 400 in FIG. 6. In FIG. 7, the first band synthesis filter 400 is provided with first to third two-band synthesis portions 401 to 403. These first to third two-band synthesis portions 401 to 403 are each provided with LPFs 411 to 413, HPFs 421 to 423, and upsamplers 431 to 433 and 441 to 443 for inserting zero to the signal at a ratio of 2:1, and adders 451 to 453.

The first two-band synthesis portion 401 receives the LL3 and LH3 signals, and then converts the signals into signals twice in size (length) by using the upsamplers 431 and 441, respectively. Then, any vertical component of the converted two signals is filtered through the LPF 411 and HPF 421, respectively, and then the filtered two signals are added to output. The second two-band synthesis portion 402 receives the HL3 and HH3 signals, and then converts the two signals into signals twice in size (length) by using the upsamplers 432 and 442. Thereafter, any vertical component of the converted two signals is filtered through the LPF 412 and HPF 422, respectively, and then the filtered two signals are added to output. The third two-band synthesis portion 403 receives outputs from the adders 451 and 452, and then respectively converts the outputs into two signals twice in size (length) by using the upsamplers 433 and 443. Then, any horizontal component of the converted two signals is filtered through the LPF 413 and HPF 423, and then the filtered signals are added to output.

Accordingly, the first band synthesis filter 400 outputs the LL2 signal low in both horizontal and vertical components, which is the second hierarchical signal. Note that, the second and third band synthesis filters 500 and 600 treat any incoming signal similarly to the above.

In such manner, the band synthesis portion 14 reconstructs, before outputting, the ten frequency band signals (LL3, LH1, LH2, LH3, HL1, HL2, HL3, HH1, HH2 and HH3) to the digital image signal 72 to which embedment has already been done.

As is known from the above, according to the digital information embedding apparatus 1a of the first embodiment, a signal is hierarchically divided into three bands, and then each absolute value of the wavelet coefficients of the LH2 and LH3 signals, among MRR, is multiplied by a pseudo-random number string in an arbitrary order. Thereafter, the resultant values are respectively multiplied by a scaling parameter, and then the wavelet coefficients of the LH2 and LH3 signals are added thereto, respectively. Accordingly, the pseudo-random number string is embedded. In this manner, the embedded pseudo-random number string can be retained even if the data is subjected to encoding. It means that inherent digital information corresponding to the pseudo-random number string is retained, and a digital information embedding apparatus can thus be realized in a simple structure.

Discrete wavelet transform performed in the digital information embedding apparatus 1a of the first embodiment is not limited to three hierarchies. The signal can be divided into more hierarchies until the LL signal reaches a 1 by 1 element. Further, bands for embedding are not limited to the LH2 and LH3 signals, but may be arbitrarily selected among MRR or may be MRR in its entirety. If this is the case, the order in which the wavelet coefficients thereof are subjected to processing is arbitrary, but should be determined in advance.

Second Embodiment

Figure 8:
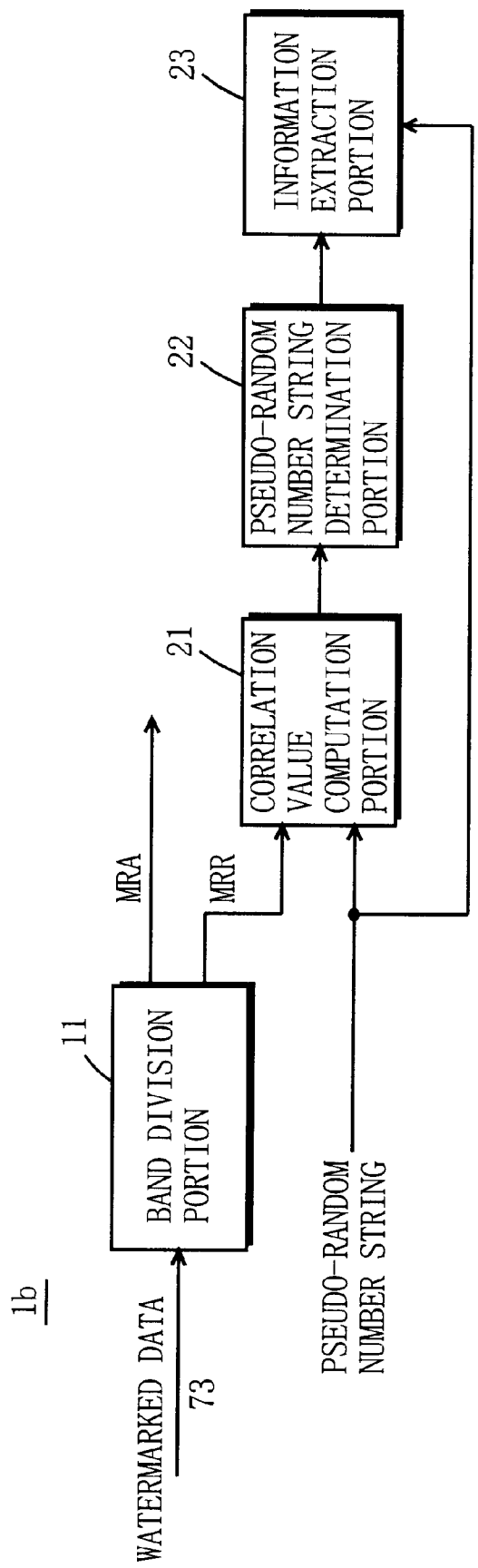
FIG. 8 is a block diagram showing the structure of a digital information extracting apparatus 1b according to a second embodiment of the present invention.

FIG. 8 is a block diagram showing the structure of a digital information extracting apparatus according to a second embodiment of the present invention. The digital information extracting apparatus 1b of the second embodiment is for extracting the digital information embedded by the digital information embedding apparatus 1a of the first embodiment.

In FIG. 8, the digital information extracting apparatus 1b of the second embodiment is provided with the band division portion 11, a correlation value computation portion 21, a pseudo-random number string determination portion 22, and an information generating portion 23. The band division portion 11 of the digital information extracting apparatus 1b is structurally the same as the band division portion 11 of the digital information embedding apparatus 1a, and is provided with the same reference numeral not to be described again.

The band division portion 11 receives a digital image signal 73. The digital image signal 73 is the digital image signal 72 outputted from the band synthesis portion 14 of the digital information embedding apparatus 1a, or a signal encoded or decompressed. The band division portion 11 subjects the received digital image signal 73 to discrete wavelet transform to divide the same into ten frequency band signals (LL3, LH1, LH2, LH3, HL1, HL2, HL3, HH1, HH2 and HH3), and computes wavelet coefficients for every signal. Herein, the band division portion 11 outputs, to the correlation value computation portion 21, the wavelet coefficients of the LH2 and LH3 signals, among MRR, in the same order as the first embodiment, i.e., first of the LH2 signal and then of the LH3 signal. The wavelet coefficients thereof are in a string in the same order as the first embodiment. On the other hand, a pseudo-random number string assumed to be embedded in the digital image signal 73 (hereinafter, referred to as assumed pseudo-random number string) is provided to the correlation value computation portion 21. The correlation value computation portion 21 computes an inner product of the string structured by the wavelet coefficients of the LH2 and LH3 signals and the assumed pseudo-random number string, and then divides the value by the length of the assumed pseudo-random number string. The resultant value can be expressed by an equation (8), where fi * is the wavelet coefficient string structured by the wavelet coefficients of the LH2 and LH3 signals (considered to be slightly different from fi' depending on processing or due to tampering), and Vi is the assumed pseudo-random number string.

$$z = \frac{1}{M} \sum_{i=1}^{M} f_i^* V_i \tag{8}$$

Herein, M denotes the length of the wavelet coefficient string fi* and the assumed pseudo-random number string Vi. In a case where the digital image signal 73 is 512 pixels by 512 pixels, the maximum value of M is "20480". In the equation (8), when the assumed pseudo-random number string Vi is equal to the pseudo-random number string Wi in the equation (7) (Vi=Wi), the value of z will be larger than a case their not being equal (Vi≠Wi).

An output of the correlation value computation portion 21 is provided to the pseudo-random number string determination portion 22. The pseudo-random number string determination portion 22 compares a predetermined threshold value with the received output. The threshold value used therein is obtained by an equation (9) next below.

$$S_Z = \frac{\alpha}{pM} \sum_{i=1}^{M} |f_i^*| (p \geq 2) \tag{9}$$

In the equation (9), a is the scaling parameter applied in the first embodiment, and p is an integer equal to or larger than two.

When the output of the correlation value computation portion 21 is larger than the predetermined threshold value, the pseudo-random number string determination portion 22 notifies the information extraction portion 23 that the pseudo-random number string used in the correlation value computation portion 21 (i.e., the wavelet coefficient string structured by the wavelet coefficients of the LH2 and LH3 signals) is positive. In response thereto, with the pseudo-random number string notified as being positive, the information extraction portion 23 extracts inherent digital information mapped thereto. The mapping is done by using the same correspondence table as stored in the mapping portion 12 in the first embodiment. On the other hand, when the output of the correlation value computation portion 21 is smaller than the predetermined threshold value in the pseudo-random number string determination portion 22, by using the assumed pseudo-random number string, the information extraction portion 23 extracts inherent digital information mapped thereto. Note that, when no assumed pseudo-random number string is determined to be positive enough, the pseudo-random number string determination portion 22 determines that the digital image signal has no pseudo-random number string embedded.

As is known from the above, according to the digital information extracting apparatus 1b of the second embodiment, an inner product of an embedded wavelet coefficient string in a predetermined frequency band and a pseudo-random number string assumed to be embedded by the digital information embedding apparatus 1a is first computed to obtain a correlation value. Thereafter, the correlation value is compared with a predetermined threshold value to determine whether or not the pseudo-random number string is positive, and then inherent digital information is extracted. In this manner, inherent digital information can be extracted through an easy operation. What is better, a third party may have little clue as to the inherent digital information if he/she has no information embedded in a predetermined frequency band. Such information includes, to be more specific, wavelet coefficients in use, an order in which the wavelet coefficients are structured in a string, and the length of a pseudo-random number string.

Note that, the digital information extracting apparatus 1b of the second embodiment obtains a correlation value by dividing an inner product of a wavelet coefficient string in a frequency band and a pseudo-random number string by the length thereof. However, only the inner product is sufficient to obtain a correlation value.

Further, a signal used in the digital information embedding and extracting apparatuses of the first and second embodiments may be a digital image signal, specifically, may be a still image or a moving image. With a moving image signal structured by 30 frames per second, for example, digital information may be embedded in or extracted from every frame or every five frame, for example, in the aforementioned manner.

Figure 9:
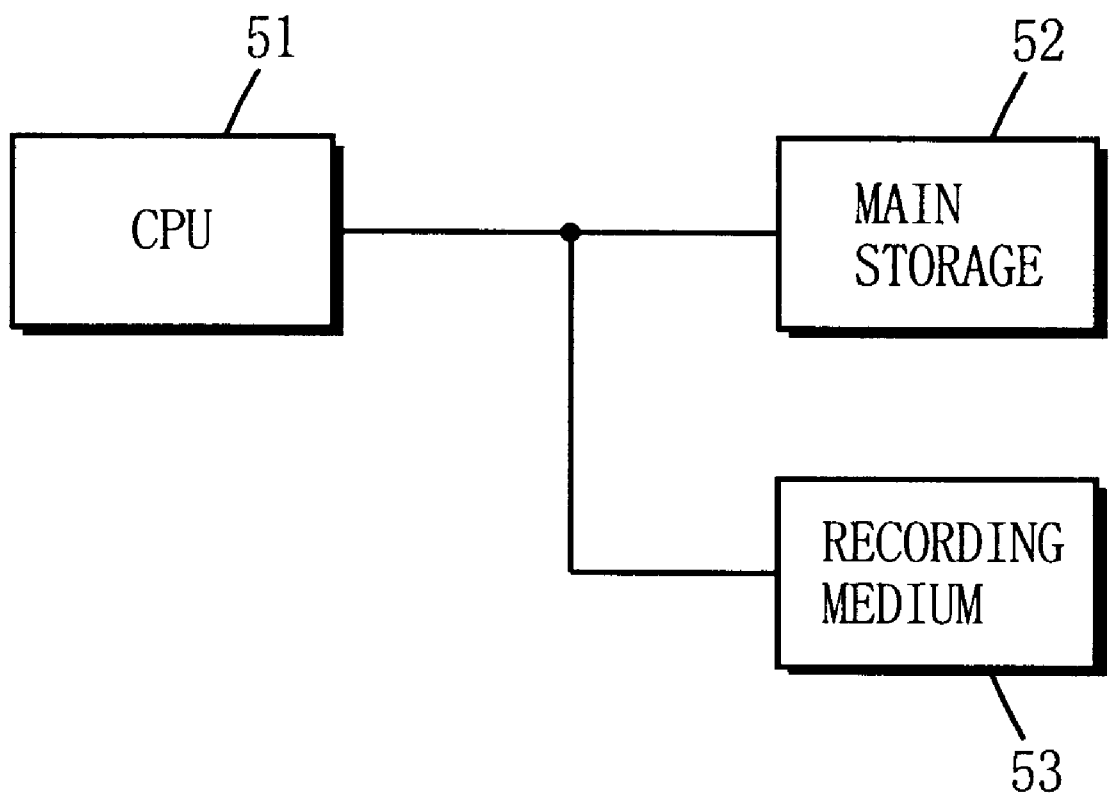
FIG. 9 is a diagram showing the structure of a system in which digital information embedding/extracting program is operated.

Typically, the processing executed respectively by the digital information embedding and extracting apparatuses of the first and second embodiments is realized as a computer program (hereinafter, referred to as digital information embedding/extracting program). FIG. 9 is a diagram showing the structure of a system in which the digital information embedding/extracting program is operated. In FIG. 9, a CPU 51 controls the program operation. The program or various types of data is stored in a main storage 52. This digital information embedding/extracting program is stored in a recording medium 53. The recording medium 53 may be in any type as long as the medium is readable/recordable, such as floppy disk or MO disk. Further, the recording medium 53 may be incorporated into a hard disk in advance, for example, and is not required to be portable. In the system shown in FIG. 9, the digital information embedding/extracting program is stored in the main storage 52, and is operated under the control of the CPU 51. Various types of provisional data required for the processing is kept in the main storage 52. The table showing the correspondence between the inherent digital information and the pseudo-random number string used in the mapping portion 12 is stored in the recording medium 53. Herein, the digital information embedding/extracting program and the correspondence table may be stored in any location as long as each location can be specified.

While the invention has been described in detail, the foregoing description is in all aspects illustrative and not restrictive. It is understood that numerous other modifica-

What is claimed is:

1. A digital information embedding/extracting apparatus of a type embedding inherent digital information in a digital image signal, the apparatus comprising:

band division means for dividing said digital image signal into coefficients in a plurality of frequency bands through discrete wavelet transform or sub-band division;

mapping means for mapping said inherent digital information to a pseudo-random number string;

information embedding means for embedding said pseudo-random number string in a string structured by the coefficients in every or some of said divided frequency bands exclusive of a lowest frequency band referred to as MRA (hereinafter, referred to as MRR); and band synthesis means for reconstructing the digital image signal in which said pseudo-random number string has been embedded by using said MRR and said MRA to which information embedding processing is subjected.

2. A digital information embedding/extracting apparatus of a type extracting inherent digital information embedded in a digital image signal, the apparatus comprising:

band division means for receiving a reconstructed digital image signal obtained by dividing said digital image signal through discrete wavelet transform or sub-band division and by embedding a pseudo-random number string in a string structured by coefficients in every or some of a plurality of frequency bands exclusive of a lowest frequency band referred to as MRA (hereinafter, referred to as MRR), and then dividing the reconstructed digital image signal into coefficients in a plurality of frequency bands through discrete wavelet transform or sub-band transform;

correlation value computation means for computing an inner product of the string structured by the coefficients in said MRR among said divided frequency bands and a predetermined pseudo-random number assumed to be embedded;

pseudo-random number string determination means for determining said pseudo-random number string embedded in said digital image signal according to the value computed by said correlation value computation means; and information extraction means for extracting said inherent digital information mapped to said determined pseudo-random number string.

3. The digital information embedding/extracting apparatus as claimed in claim 1, wherein said pseudo-random number string is structured by numbers selected from normally-distributed average values of "0" and distribution values of "1".

4. The digital information embedding/extracting apparatus as claimed in claim 2, wherein said pseudo-random number string is structured by numbers selected from normally-distributed average values of "0" and distribution values of "1".

5. The digital information embedding/extracting apparatus as claimed in claim 2, wherein, when the value computed by said correlation value computation means is larger than a predetermined value, said pseudo-random number string determination means determines that pseudo-random number string which embedded in the string structured by the coefficients in said MRR is positively identified as being said pseudo-random number string.

6. The digital information embedding/extracting apparatus as claimed in claim 4, wherein, when the value computed by said correlation value computation means is larger than a predetermined value, said pseudo-random number string determination means determines that pseudo-random number string which embedded in the string structured by the coefficients in said MRR is positively identified as being said pseudo-random number string.

7. The digital information embedding/extracting apparatus as claimed in claim 1, wherein, on dividing said digital image signal into the coefficients in the plurality of frequency bands, said band division means divides the digital image signal into a plurality of hierarchies, and said information embedding means embeds said pseudo-random number string in a string structured by every or some of the coefficients in a second or higher hierarchies in said MRR among said divided frequency bands.

8. The digital information embedding/extracting apparatus as claimed in claim 3, wherein, on dividing said digital image signal into the coefficients in the plurality of frequency bands, said band division means divides the digital image signal into a plurality of hierarchies, and said information embedding means embeds said pseudo-random number string in a string structured by every or some of the coefficients in a second or higher hierarchies in said MRR among said divided frequency bands.

9. The digital information embedding/extracting apparatus as claimed in claim 1, wherein, among said MRR, said information embedding means embeds said pseudo-random number string in a string structured by every or some of coefficients in a region high in a horizontal frequency component and low in a vertical frequency component (HL region), and by every or some of coefficients in a region low in the horizontal frequency component and high in the vertical frequency component (LH region).

10. The digital information embedding/extracting apparatus as claimed in claim 3, wherein, among said MRR, said information embedding means embeds said pseudo-random number string in a string structured by every or some of coefficients in a region high in a horizontal frequency component and low in a vertical frequency component (HL region), and by every or some of coefficients in a region low in the horizontal frequency component and high in the vertical frequency component (LH region).

11. The digital information embedding/extracting apparatus as claimed in claim 7, wherein, among said MRR, said information embedding means embeds said pseudo-random number string in a string structured by every or some of coefficients in a region high in a horizontal frequency component and low in a vertical frequency component (HL region), and by every or some of coefficients in a region low in the horizontal frequency component and high in the vertical frequency component (LH region).

12. The digital information embedding/extracting apparatus as claimed in claim 8, wherein, among said MRR, said information embedding means embeds said pseudo-random number string in a string structured by every or some of coefficients in a region high in a horizontal frequency component and low in a vertical frequency component (HL region), and by every or some of coefficients in a region low in the horizontal frequency component and high in the vertical frequency component (LH region).

13. The digital information embedding/extracting apparatus as claimed in claim 1, wherein, among said MRR, said information embedding means embeds said pseudo-random number string in a string structured by every or some of coefficients in either a region high in a horizontal frequency component and low in a vertical frequency component (HL region) or a region low in the horizontal frequency component and high in the vertical frequency component (LH region).

14. The digital information embedding/extracting apparatus as claimed in claim 3, wherein, among said MRR, said information embedding means embeds said pseudo-random number string in a string structured by every or some of coefficients in either a region high in a horizontal frequency component and low in a vertical frequency component (HL region) or a region low in the horizontal frequency component and high in the vertical frequency component (LH region).

15. The digital information embedding/extracting apparatus as claimed in claim 7, wherein, among said MRR, said information embedding means embeds said pseudo-random number string in a string structured by every or some of coefficients in either a region high in a horizontal frequency component and low in a vertical frequency component (HL region) or a region low in the horizontal frequency component and high in the vertical frequency component (LH region).

16. The digital information embedding/extracting apparatus as claimed in claim 8, wherein, among said MRR, said information embedding means embeds said pseudo-random number string in a string structured by every or some of coefficients in either a region high in a horizontal frequency component and low in a vertical frequency component (HL region) or a region low in the horizontal frequency component and high in the vertical frequency component (LH region).

17. A method of embedding/extracting digital information of a type embedding inherent digital information in a digital image signal, the method comprising the steps of:

dividing said digital image signal into coefficients in a plurality of frequency bands through discrete wavelet transform or sub-band division;

mapping said inherent digital information to a pseudo-random number string;

embedding said pseudo-random number string in a string structured by the coefficients in every or some of said divided frequency bands exclusive of a lowest frequency band referred to as MRA (hereinafter, referred to as MRR); and reconstructing the digital image signal in which said pseudo-random number string has been embedded by using said MRR and said MRA to which information embedding processing is subjected.

18. A method of embedding/extracting digital information of a type extracting inherent digital information embedded in a digital image signal, the method comprising the steps of:

receiving a reconstructed digital image signal obtained by dividing said digital image signal through discrete wavelet transform or sub-band division and by embedding a pseudo-random number string in a string structured by coefficients in every or some of a plurality of frequency bands exclusive of a lowest frequency band referred to as MRA (hereinafter, referred to as MRR), and then dividing the reconstructed digital image signal into coefficients in a plurality of frequency bands through discrete wavelet transform or sub-band transform;

computing an inner product of the string structured by the coefficients in said MRR among said divided frequency bands and predetermined pseudo-random number assumed to be embedded;

determining said pseudo-random number string embedded in said digital image signal according to said computed inner product; and generating said inherent digital information mapped to said determined pseudo-random number string.

19. The method of embedding/extracting digital information as claimed in claim 17, wherein said pseudo-random number string is structured by numbers selected from normally-distributed average values of "0" and distribution values of "1".

20. The method of embedding/extracting digital information as claimed in claim 18, wherein said pseudo-random number string is structured by numbers selected from normally-distributed average values of "0" and distribution values of "1".

21. The method of embedding/extracting digital information as claimed in claim 18, wherein, when said computed inner product is larger than a predetermined value, in said pseudo-random number string determination step, pseudo-random number string which embedded in the string structured by the coefficients in said MRR is positively determined as being said pseudo-random number string.

22. The method of embedding/extracting digital information as claimed in claim 20, wherein, when said computed inner product is larger than a predetermined value, in said pseudo-random number string determination step, pseudo-random number string which embedded in the string structured by the coefficients in said MRR is positively determined as being said pseudo-random number string.

23. The method of embedding/extracting digital information as claimed in claim 17, wherein, in said band division step, said digital image signal is divided into a plurality of hierarchies when being divided into coefficients in a plurality of frequency bands, and in said pseudo-random number string embedding step, said pseudo-random number string is embedded in a string structured by every or some of the coefficients in a second or higher hierarchies in said MRR among said divided frequency bands.

24. The method of embedding/extracting digital information as claimed in claim 19, wherein, in said band division step, said digital image signal is divided into a plurality of hierarchies when being divided into coefficients in a plurality of frequency bands, and in said pseudo-random number string embedding step, said pseudo-random number string is embedded in a string structured by every or some of the coefficients in a second or higher hierarchies in said MRR among said divided frequency bands.

25. The method of embedding/extracting digital information as claimed in claim 17, wherein, in said pseudo-random number string embedding step, among said MRR, said pseudo-random number string is embedded in a string structured by every or some of coefficients in a region high in a horizontal frequency component and low in a vertical frequency component (HL region), and by every or some of coefficients in a region low in the horizontal frequency component and high in the vertical frequency component (LH region).

26. The method of embedding/extracting digital information as claimed in claim 19, wherein, in said pseudo-random number string embedding step, among said MRR, said pseudo-random number string is embedded in a string structured by every or some of coefficients in a region high in a horizontal frequency component and low in a vertical frequency component (HL region), and by every or some of coefficients in a region low in the horizontal frequency component and high in the vertical frequency component (LH region).

27. The method of embedding/extracting digital information as claimed in claim 23, wherein, in said pseudo-random number string embedding step, among said MRR, said pseudo-random number string is embedded in a string structured by every or some of coefficients in a region high in a horizontal frequency component and low in a vertical frequency component (HL region), and by every or some of coefficients in a region low in the horizontal frequency component and high in the vertical frequency component (LH region).

28. The method of embedding/extracting digital information as claimed in claim 24, wherein, in said pseudo-random number string embedding step, among said MRR, said pseudo-random number string is embedded in a string structured by every or some of coefficients in a region high in a horizontal frequency component and low in a vertical frequency component (HL region), and by every or some of coefficients in a region low in the horizontal frequency component and high in the vertical frequency component (LH region).

29. The method of embedding/extracting digital information as claimed in claim 17, wherein, in said pseudo-random number string embedding step, among said MRR, said pseudo-random number string is embedded in a string structured by every or some of coefficients in either a region high in a horizontal frequency component and low in a vertical frequency component (HL region) or a region low in the horizontal frequency component and high in the vertical frequency component (LH region).

30. The method of embedding/extracting digital information as claimed in claim 19, wherein, in said pseudo-random number string embedding step, among said MRR, said pseudo-random number string is embedded in a string structured by every or some of coefficients in either a region high in a horizontal frequency component and low in a vertical frequency component (HL region) or a region low in the horizontal frequency component and high in the vertical frequency component (LH region).

31. The method of embedding/extracting digital information as claimed in claim 23, wherein, in said pseudo-random number string embedding step, among said MRR, said pseudo-random number string is embedded in a string structured by every or some of coefficients in either a region high in a horizontal frequency component and low in a vertical frequency component (HL region) or a region low in the horizontal frequency component and high in the vertical frequency component (LH region).

32. The method of embedding/extracting digital information as claimed in claim 24, wherein, in said pseudo-random number string embedding step, among said MRR, said pseudo-random number string is embedded in a string structured by every or some of coefficients in either a region high in a horizontal frequency component and low in a vertical frequency component (HL region) or a region low in the horizontal frequency component and high in the vertical frequency component (LH region).

33. A recording medium on which a program to be run in a computer device is recorded, the program being for realizing an operational environment in said computer device comprising the steps of:

dividing a digital image signal into coefficients in a plurality of frequency bands through discrete wavelet transform or sub-band division;

mapping inherent digital information to a pseudo-random number string;

embedding said pseudo-random number string in a string structured by transform the coefficients in every or some of said divided frequency bands exclusive of a lowest frequency band referred to as MRA (hereinafter, referred to as MRR); and reconstructing the digital image signal in which said pseudo-random number string has been embedded by using said MRR and said MRA to which information embedding processing is subjected.

34. A recording medium on which a program to be run in a computer device is recorded, the program being for realizing an operational environment in said computer device comprising the steps of:

receiving a reconstructed digital image signal obtained by dividing said digital image signal through discrete wavelet transform or sub-band division and by embedding a pseudo-random number string in a string structured by coefficients in every or some of a plurality of frequency bands exclusive of a lowest frequency band referred to as MRA (hereinafter, referred to as MRR), and then dividing the reconstructed digital image signal into coefficients in a plurality of frequency bands through discrete wavelet transform or sub-band transform;

computing an inner product of the string structured by the coefficients in said MRR among said divided frequency bands and a predetermined pseudo-random number assumed to be embedded;

determining said pseudo-random number string embedded in said digital image signal according to said computed inner product; and generating said inherent digital information mapped to said determined pseudo-random number string.

35. The recording medium as claimed in claim 33, wherein said pseudo-random number string is structured by numbers selected from normally-distributed average values of "0" and distribution values of "1".

36. The recording medium as claimed in claim 34, wherein said pseudo-random number string is structured by numbers selected from normally-distributed average values of "0" and distribution values of "1".

37. The recording medium as claimed in claim 34, wherein, when said computed inner product is larger than a predetermined value, in said pseudo-random number string determination step, pseudo-random number string which embedded in the string structured by the coefficients in said MRR is positively determined as being said pseudo-random number string.

38. The recording medium as claimed in claim 36, wherein, when said computed inner product is larger than a predetermined value, in said pseudo-random number string determination step, pseudo-random number string which embedded in the string structured by the coefficients in said MRR is positively determined as being said pseudo-random number string.

39. The recording medium as claimed in claim 33, wherein, in said band division step, said digital image signal is divided into a plurality of hierarchies when being divided into coefficients in a plurality of frequency bands, and in said pseudo-random number string embedding step, said pseudo-random number string is embedded in a string structured by every or some of the coefficients in a second or higher hierarchies in said MRR among said divided frequency bands.

40. The recording medium as claimed in claim 35, wherein, in said band division step, said digital image signal is divided into a plurality of hierarchies when being divided into coefficients in a plurality of frequency bands, and in said pseudo-random number string embedding step, said pseudo-random number string is embedded in a string structured by every or some of the coefficients in a second or higher hierarchies in said MRR among said divided frequency bands.

41. The recording medium as claimed in claim 33, wherein, in said pseudo-random number string embedding step, among said MRR, said pseudo-random number string is embedded in a string structured by every or some of coefficients in a region high in a horizontal frequency component and low in a vertical frequency component (HL region), and by every or some of coefficients in a region low in the horizontal frequency component and high in the vertical frequency component (LH region).

42. The recording medium as claimed in claim 35, wherein, in said pseudo-random number string embedding step, among said MRR, said pseudo-random number string is embedded in a string structured by every or some of coefficients in a region high in a horizontal frequency component and low in a vertical frequency component (HL region), and by every or some of coefficients in a region low in the horizontal frequency component and high in the vertical frequency component (LH region).

43. The recording medium as claimed in claim 39, wherein, in said pseudo-random number string embedding step, among said MRR, said pseudo-random number string is embedded in a string structured by every or some of coefficients in a region high in a horizontal frequency component and low in a vertical frequency component (HL region), and by every or some of coefficients in a region low in the horizontal frequency component and high in the vertical frequency component (LH region).

44. The recording medium as claimed in claim 40, wherein, in said pseudo-random number string embedding step, among said MRR, said pseudo-random number string is embedded in a string structured by every or some of coefficients in a region high in a horizontal frequency component and low in a vertical frequency component (HL region), and by every or some of coefficients in a region low in the horizontal frequency component and high in the vertical frequency component (LH region).

45. The recording medium as claimed in claim 33, wherein, in said pseudo-random number string embedding step, among said MRR, said pseudo-random number string is embedded in a string structured by every or some of coefficients in either a region high in a horizontal frequency component and low in a vertical frequency component (HL region) or a region low in the horizontal frequency component and high in the vertical frequency component (LH region).

46. The recording medium as claimed in claim 35, wherein, in said pseudo-random number string embedding step, among said MRR, said pseudo-random number string is embedded in a string structured by every or some of coefficients in either a region high in a horizontal frequency component and low in a vertical frequency component (HL region) or a region low in the horizontal frequency component and high in the vertical frequency component (LH region).

47. The recording medium as claimed in claim 39, wherein, in said pseudo-random number string embedding step, among said MRR, said pseudo-random number string is embedded in a string structured by every or some of coefficients in either a region high in a horizontal frequency component and low in a vertical frequency component (HL region) or a region low in the horizontal frequency component and high in the vertical frequency component (LH region).

48. The recording medium as claimed in claim 40, wherein, in said pseudo-random number string embedding step, among said MRR, said pseudo-random number string is embedded in a string structured by every or some of coefficients in either a region high in a horizontal frequency component and low in a vertical frequency component (HL region) or a region low in the horizontal frequency component and high in the vertical frequency component (LH region).

\* \* \* \* \*

UNITED STATES PATENT AND TRADEMARK OFFICE
CERTIFICATE OF CORRECTION

PATENT NO. : 6,639,997 B1
DATED : October 28, 2003
INVENTOR(S) : Takashi Katsura et al.

It is certified that error appears in the above-identified patent and that said Letters Patent is hereby corrected as shown below:

<u>Title page,</u>
Item [57], ABSTRACT,
Line 37, replace "A band synthesis portion synthesizes the embedded LL3 digital image signal" with -- A band synthesis portion synthesizes the embedded LL3 signal and other frequency bands signals so as to reconstruct a digital image signal --.

<u>Column 1, line 7 to Column 22, line 39,</u>
Please replace with the following:

BACKGROUND OF THE INVENTION

Field of the Invention

The present invention relates to an apparatus for and a method of embedding and extracting digital information, and a medium having a program for carrying out the method recorded thereon, more particularly to, for copyright protection, an apparatus for and a method of embedding digital data such as copyright information in an image signal and extracting the same, and a medium having a program for carrying out the method recorded thereon.

Description of the Background Art

In recent years, developments in digital technology accelerate digitalization of multimedia data including audio, image and video. The digitalized multimedia data has been getting popular through high-speed transmission in volume. Such multimedia data, however, is easy to duplicate and hence any unauthorized person is free to duplicate copyrighted digital images for secondary utilization.

To get around such problem, an electron (digital) watermark technique is applied. The digital watermarking is a technique for embedding digital information in image data in an insensible form for human being. With such digital watermark technique, a copyright holder can claim that his/her copyright is illegally used by extracting embedded information as a proof.

The conventional digital watermark technique includes a method disclosed in Japanese Patent Laying-Open No.9-191394 (hereinafter, referred to as first document). The first document proposes a method of embedding, according to normal or random distribution, an embedding value in a key component for image quality after spectrum decomposition is done on data. More specifically, in the first document, embedment is done with an equation (1) and extraction with an equation (2), where $Wi$ is a pseudo-random number string (embedding value), $fi$ is a frequency coefficient of before-watermarking data, $fi'$ is a frequency coefficient of after-watermarking data,

UNITED STATES PATENT AND TRADEMARK OFFICE
CERTIFICATE OF CORRECTION

PATENT NO. : 6,639,997 B1
DATED : October 28, 2003
INVENTOR(S) : Takashi Katsura et al.

It is certified that error appears in the above-identified patent and that said Letters Patent is hereby corrected as shown below:

<u>Column 1, line 7 to Column 22, line 39 (cont'd),</u> and $\alpha$ is a scaling parameter.

$$f_i' = f_i + \alpha f_i W_i \quad \cdots \quad (1)$$

$$W_i = \frac{f_i' - f_i}{\alpha f_i} \quad \cdots \quad (2)$$

Although the method advantageously renders the embedding value difficult to eliminate, it does not store positional information on the frequency coefficient into which the embedding value is inserted. To extract the embedding value, the method accordingly requires before-embedding original data.

Differently, Japanese Patent Laying-Open No.10-308867 (hereinafter, second document) discloses a method which does not require original data. In the second document, embedment is done with an equation (3) and extraction with (4), where $avg(fi)$ is a partial average of the frequency coefficient $fi$ of before-watermarking data.

$$f_i' = f_i + \alpha \, avg(f_i) W_i \quad \cdots \quad (3)$$

$$\frac{f_i'}{avg(f_i')} = \frac{f_i + \alpha \, avg(f_i) W_i}{avg(f_i')}$$

$$(\because avg(f_i) = avg(f_i'))$$

$$= \frac{f_i}{avg(f_i')} + \alpha W_i$$

$$\fallingdotseq \alpha W_i \quad \cdots \quad (4)$$

UNITED STATES PATENT AND TRADEMARK OFFICE
CERTIFICATE OF CORRECTION

PATENT NO. : 6,639,997 B1
DATED : October 28, 2003
INVENTOR(S) : Takashi Katsura et al.

It is certified that error appears in the above-identified patent and that said Letters Patent is hereby corrected as shown below:

Column 1, line 7 to Column 22, line 39 (cont'd),

The equation (4) having no $fi$ on the right part thereof indicates that there is no longer a need for the original data. However, the method is still required to perform DCT (Discrete Cosine Transform) and compute the reciprocal of the partial average of data. In this manner, applying such method to data in volume like image data results in great computation effort.

For betterment, another method is disclosed in Japanese Patent Laying-Open No.10-145757 (hereinafter, third document). In the third document, embedment is done with an equation (5) and extraction with an equation (6), where $|fi|$ is an absolute value of the frequency coefficient $fi$ of before-watermarking data.

For the purpose of reducing the great effort required in the second document, the pseudo-random number string (embedding value) is first divided into several units, and then each unit of numbers is subjected to watermarking. When each unit is 8 by 8 in size, this method can be carried out by utilizing the procedure of MPEG, which is a manner of encoding moving images. In this manner, computational complexity accordingly gets lower, but the method is still required to compute the reciprocal of the partial average of data and great in computation effort.

$$f_i' = f_i + \alpha\, avg(|f_i|)\, W_i \quad \cdots (5)$$

$$\frac{f_i'}{avg(|f_i'|)} = \frac{f_i + \alpha\, avg(|f_i|)\, W_i}{avg(|f_i'|)}$$

$$= \frac{f_i}{avg(|f_i'|)} + \alpha W_i \quad (\because avg(|f_i|) = avg(|f_i'|))$$

$$\fallingdotseq \alpha W_i \quad \cdots (6)$$

UNITED STATES PATENT AND TRADEMARK OFFICE
CERTIFICATE OF CORRECTION

PATENT NO. : 6,639,997 B1
DATED : October 28, 2003
INVENTOR(S) : Takashi Katsura et al.

It is certified that error appears in the above-identified patent and that said Letters Patent is hereby corrected as shown below:

Column 1, line 7 to Column 22, line 39 (cont'd),

The method in the third document is relevant to MPEG. Described below are methods of embedding (inserting) and extracting an embedding value disclosed in the second document.

Figure 10:
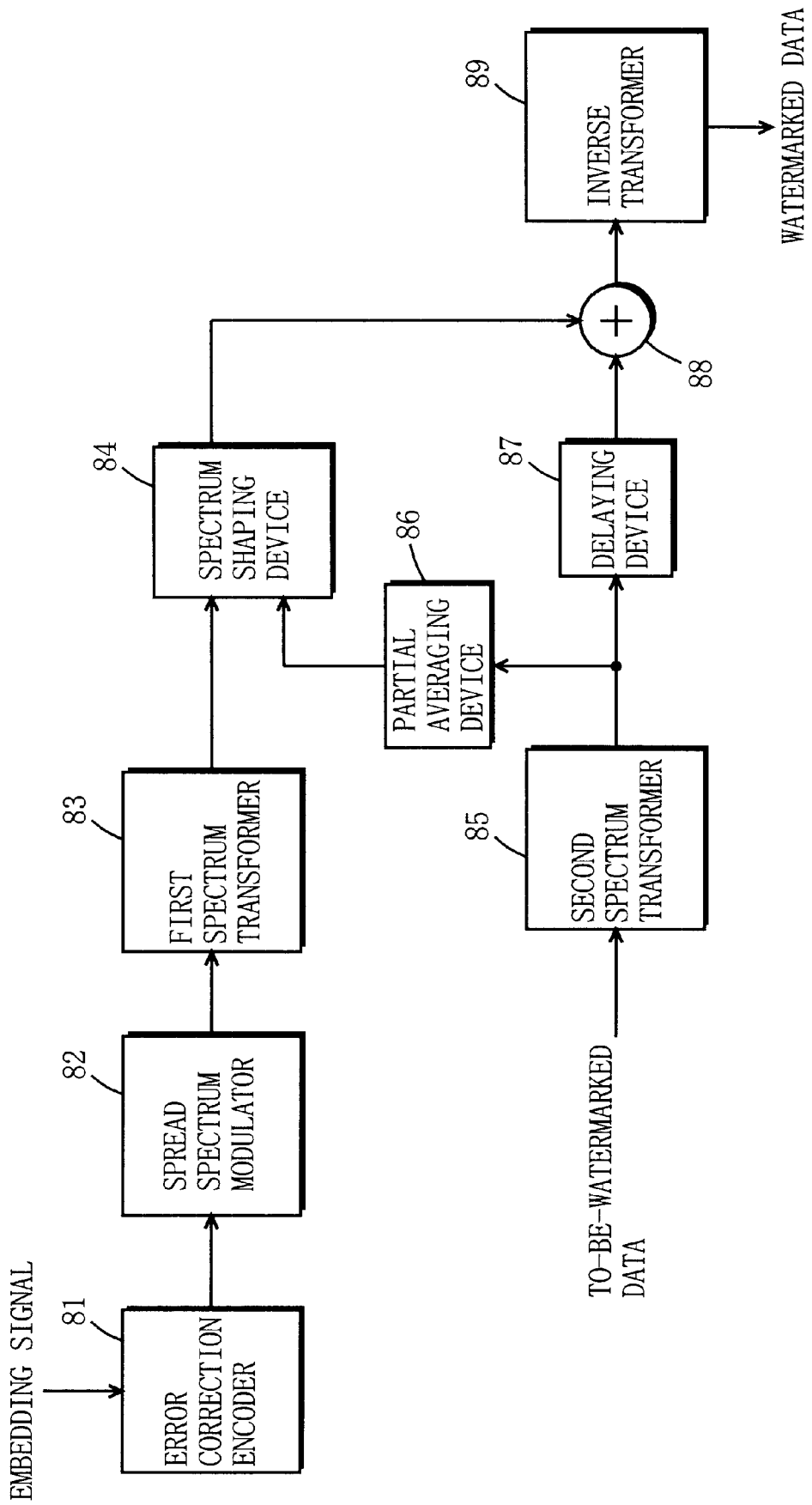
FIG. 10 is a block diagram showing the structure of a conventional apparatus for embedding an embedding value.

First, the method of embedding is described by referring to FIG. 10. An embedding signal first goes through an error correction encoder 81, secondly through a spread spectrum modulator 82, and lastly through a first spectrum transformer 83 and reaches a spectrum shaping device 84 as a first input. On the other hand, before-watermarking data is provided to a second spectrum transformer 85. An output of the second spectrum transformer 85 is partially averaged temporally or spatially in a partial averaging device 86 before provided to the spectrum shaping device 84 as a second input, and is also provided to a delaying device 87. An output of the spectrum shaping device 84 is added to that of the delaying device 87 in an adder 88. An output of the adder 88 is inversely-transformed in an inverse transformer 89, and thus data is watermarked.

Figure 11:
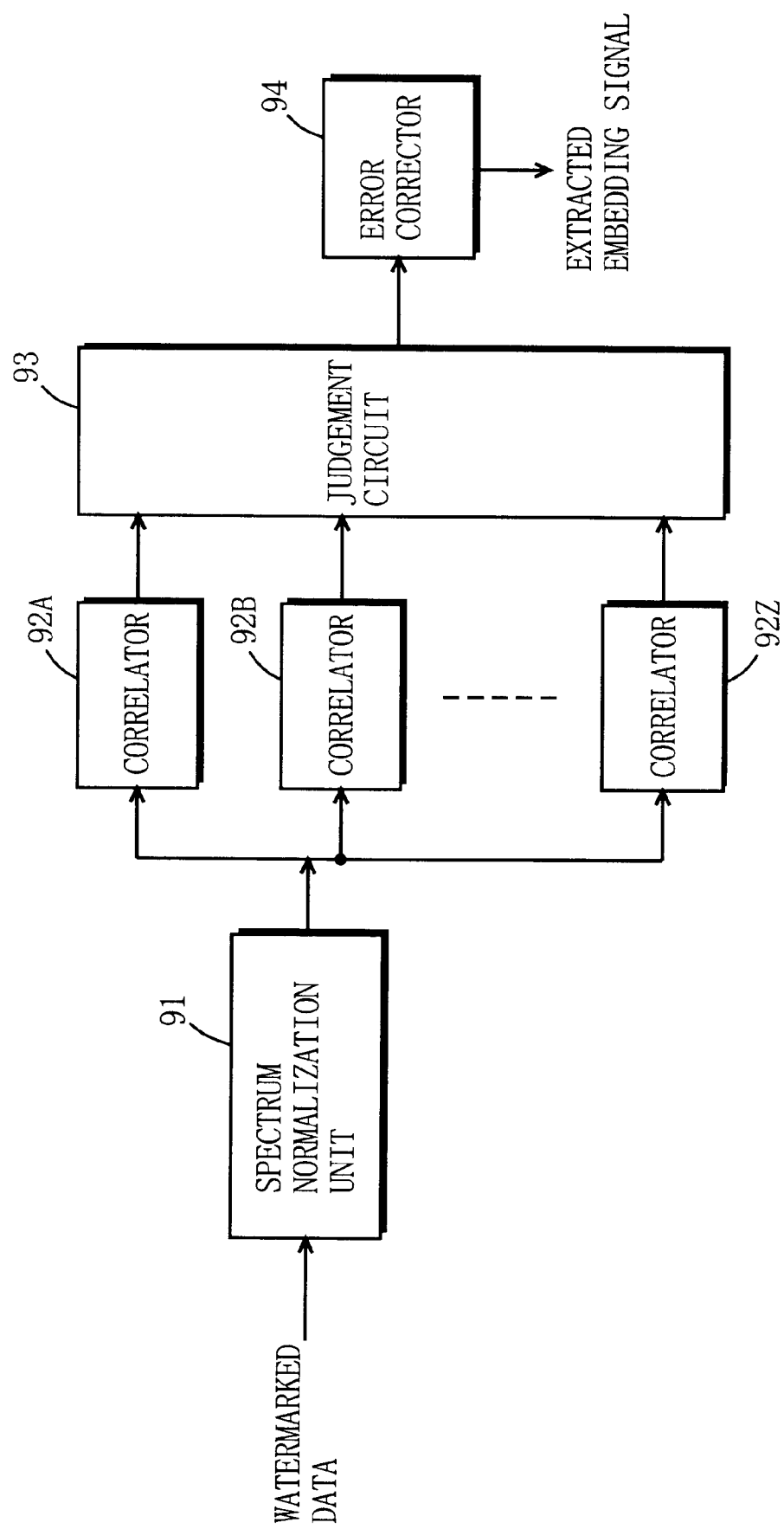
FIG. 11 is a block diagram showing the structure of a conventional apparatus for extracting an embedding value.

Next, the method of extracting is described by referring to FIG. 11. A spectrum normalization unit 91 receives the watermarked data and then subjects the data to spectrum normalization so as to put the data back to a state before watermarking. Then, the normalized signal is analyzed in correlators 92A to 92Z. The correlators 92A to 92Z each detects a specific pseudo-random number sequence in the signal, if any, correlates the normalized signal to the pseudo-random number sequence, and then provides an output indicating a degree of the correlation therebetween to a judgment circuit 93. The judgement circuit 93 sequentially selects an output being maximum as a most-probable current symbol among current symbols received from the correlators. Further, a sequence of the selected maximum likelihood current symbol is provided to the error corrector 94 so as to correct any error in the judgement made in the judgement circuit 93. In this manner, the embedding signal is extracted as an output of the error corrector 94.

To eliminate the need for original data, the method in the foregoing results in another need for a partial average to embed an embedding signal and for spectrum shaping by using the partial average. Further, to extract the embedding signal, there is still another need for spectrum normalization to put the embedding signal back to a state before watermarking. In a practical manner, the reciprocal of the partial average is computed. Still further, the method requires a plurality of correlators for extraction, and is required to correct errors at the end. Accordingly, the method bears a problem of great computation effort for extraction.

UNITED STATES PATENT AND TRADEMARK OFFICE
CERTIFICATE OF CORRECTION

PATENT NO. : 6,639,997 B1
DATED : October 28, 2003
INVENTOR(S) : Takashi Katsura et al.

It is certified that error appears in the above-identified patent and that said Letters Patent is hereby corrected as shown below:

Column 1, line 7 to Column 22, line 39 (cont'd),

SUMMARY OF THE INVENTION

Therefore, in view of the above problems, an object of the present invention is, with the help of simple spectrum transformation for embedding and an inner product computed for extraction, to provide an apparatus for and a method of embedding and extracting digital information, in a simplified manner with less effort, with little clue to a third party as to the embedded digital information, and a medium on which a program for carrying out the method is recorded.

The present invention has the following features to achieve the object above.

A first aspect of the present invention is directed to a digital information embedding/extracting apparatus of a type embedding inherent digital information in a digital image signal, the apparatus comprising:

a band division portion for dividing the digital image signal into coefficients in a plurality of frequency bands through discrete wavelet transform or sub-band division; a mapping portion for mapping the inherent digital information to a pseudo-random number string;

an information embedding portion for embedding the pseudo-random number string in a string structured by the coefficients in every or some of the divided frequency bands exclusive of a lowest frequency band referred to as MRA (hereinafter, referred to as MRR); and a band synthesis portion for reconstructing the digital image signal in which the pseudo-random number string has been embedded by using the MRR and the MRA to which information embedding processing is subjected.

As described above, in the first aspect, inherent digital information can be embedded without causing image degradation or necessitating positional information thereof.

A second aspect of the present invention is directed to a digital information embedding/extracting apparatus of a type extracting inherent digital information embedded in a digital image signal, the apparatus comprising:

a band division portion (11) for receiving a reconstructed digital image signal obtained by dividing the digital image signal through discrete wavelet transform or sub-band division and by embedding a pseudo-random number string in a string structured by coefficients in every or some of a plurality of frequency bands exclusive of a lowest frequency band referred to as MRA (hereinafter, referred to as MRR), and then dividing the reconstructed digital image signal into coefficients in a plurality of frequency bands through discrete wavelet transform or sub-band transform;

UNITED STATES PATENT AND TRADEMARK OFFICE
CERTIFICATE OF CORRECTION

PATENT NO. : 6,639,997 B1
DATED : October 28, 2003
INVENTOR(S) : Takashi Katsura et al.

It is certified that error appears in the above-identified patent and that said Letters Patent is hereby corrected as shown below:

Column 1, line 7 to Column 22, line 39 (cont'd), a correlation value computation portion for computing an inner product of the string structured by the coefficients in the MRR among the divided frequency bands and a predetermined pseudo-random number assumed to be embedded;

a pseudo-random number string determination portion for determining the pseudo-random number string embedded in the digital image signal according to the value computed by the correlation value computation portion; and an information extraction portion for extracting the inherent digital information mapped to the determined pseudo-random number string.

As described above, in the second aspect, embedded inherent digital information can be extracted in a simplified structure.

According to third and fourth aspects of the present invention, in the first and second aspects, respectively, the pseudo-random number string is structured by numbers selected from normally-distributed average values of "0" and distribution values of "1".

As described above, in the third and fourth aspects, a pseudo-random number string can be easily generated in an arbitrary length, whereby an embedding apparatus can be in a simplified structure. Further, since numbers in a string are totaled to be 0 if the string is long enough, a correlation peak value can be specified by computing an inner product. In this manner, an extracting apparatus in a simplified structure can be realized.

According to fifth and sixth aspects of the present invention, in the second and fourth aspects, respectively, when the value computed by the correlation value computation portion is larger than a predetermined threshold value, the pseudo-random number string determination portion determines that pseudo-random number string which embedded in the string structured by

UNITED STATES PATENT AND TRADEMARK OFFICE
CERTIFICATE OF CORRECTION

PATENT NO. : 6,639,997 B1
DATED : October 28, 2003
INVENTOR(S) : Takashi Katsura et al.

It is certified that error appears in the above-identified patent and that said Letters Patent is hereby corrected as shown below:

Column 1, line 7 to Column 22, line 39 (cont'd), the coefficients in the MRR is positively identified as being the pseudo-random number string.

As described above, in the fifth and sixth aspects, determination is made only by comparing an output value of the correlation value computation portion with a predetermined threshold value. Therefore, an extracting apparatus can be in a simplified structure.

According to seventh and eighth aspects of the present invention, in the first and third aspects, respectively, on dividing the digital image signal into the coefficients in the plurality of frequency bands, the band division portion divides the digital image signal into a plurality of hierarchies, and the information embedding portion embeds the pseudo-random number string in a string structured by every or some of the coefficients in a second or higher hierarchies in the MRR among the divided frequency bands.

According to ninth to twelfth aspects of the present invention, in the first, third, seventh and eighth aspect, respectively, among the MRR, the information embedding portion embeds the pseudo-random number string in a string structured by every or some of coefficients in a region high in a horizontal frequency component and low in a vertical frequency component (HL region), and by every or some of coefficients in a region low in the horizontal frequency component and high in the vertical frequency component (LH region).

According to thirteenth to sixteenth aspects of the present invention, in the first, third, seventh and eighth aspects, respectively, among the MRR, the information embedding portion embeds the pseudo-random number string in a string structured by every or some of coefficients in either an HL region or an LH region.

As described above, in the seventh to sixteenth aspects, embedded digital information can be retained even if the information is subjected to processing of cutting high frequency regions such as encoding.

A seventeenth aspect of the present invention is directed to a method of embedding/extracting digital information of a type embedding inherent digital information in a digital image signal, the method comprising the steps of:

dividing the digital image signal into coefficients in a plurality of frequency bands through discrete wavelet transform or sub-band division;

mapping the inherent digital information to a pseudo-random number string;

embedding the pseudo-random number string in a string structured by the coefficients in every or some of the divided frequency bands exclusive of a lowest frequency band referred to as MRA (hereinafter, referred to as MRR); and reconstructing the digital image signal in which the pseudo-random number string

UNITED STATES PATENT AND TRADEMARK OFFICE
CERTIFICATE OF CORRECTION

PATENT NO. : 6,639,997 B1
DATED : October 28, 2003
INVENTOR(S) : Takashi Katsura et al.

It is certified that error appears in the above-identified patent and that said Letters Patent is hereby corrected as shown below:

<u>Column 1, line 7 to Column 22, line 39 (cont'd),</u> has been embedded by using the MRR and the MRA to which information embedding processing is subjected.

As described above, in the seventeenth aspect, inherent digital information can be embedded without causing image degradation or necessitating positional information thereof.

An eighteenth aspect of the present invention is directed to a method of embedding/extracting digital information of a type extracting inherent digital information embedded in a digital image signal, the method comprising the steps of:

receiving a reconstructed digital image signal obtained by dividing said digital image signal through discrete wavelet transform or sub-band division and by embedding a pseudo-random number string in a string structured by coefficients in every or some of a plurality of frequency bands exclusive of a lowest frequency band referred to as MRA (hereinafter, referred to as MRR), and then dividing the reconstructed digital image signal into coefficients in a plurality of frequency bands through discrete wavelet transform or sub-band transform;

computing an inner product of the string structured by the coefficients in the MRR among the divided frequency bands and a predetermined pseudo-random number assumed to be embedded;

determining the pseudo-random number string embedded in the digital image signal according to the computed inner product; and generating the inherent digital information mapped to the determined pseudo-random number string.

As described above, in the eighteenth aspect, embedded inherent digital information can be extracted in a simplified structure.

According to nineteenth and twentieth aspects, in the seventeenth and eighteenth aspects, respectively, the pseudo-random number string is structured by numbers selected from normally-distributed average values of "0" and distribution values of "1".

As described above, in the nineteenth and twentieth aspects, a pseudo-random number string can be easily generated in an arbitrary length, whereby an embedding apparatus can be in a simplified structure. Further, since numbers in a string are totaled to be 0 if the string is long enough, a correlation peak value can be specified by computing an inner product. In this manner, an extracting apparatus in a simplified structure can be realized.

According to twenty-first and twenty-second aspects of the present invention, in the eighteenth and twentieth aspects, respectively, when the computed inner product is larger than a

UNITED STATES PATENT AND TRADEMARK OFFICE
CERTIFICATE OF CORRECTION

PATENT NO. : 6,639,997 B1
DATED : October 28, 2003
INVENTOR(S) : Takashi Katsura et al.

It is certified that error appears in the above-identified patent and that said Letters Patent is hereby corrected as shown below:

Column 1, line 7 to Column 22, line 39 (cont'd), predetermined value, in the pseudo-random number string determination step, pseudo-random number string which embedded in the string structured by the coefficients in the MRR is positively determined as being the pseudo-random number string.

As described above, in the twenty-first and twenty-second aspects, determination is made only by comparing an inner product obtained through computation with a predetermined threshold value. Therefore, an extracting apparatus in a simplified structure can be realized.

According to twenty-third and twenty-fourth aspects of the present invention, in the seventeenth and nineteenth aspect, respectively, in the band division step, the digital image signal is divided into a plurality of hierarchies when being divided into coefficients in a plurality of frequency bands, and in the pseudo-random number string embedding step, the pseudo-random number string is embedded in a string structured by every or some of the coefficients in a second or higher hierarchies in the MRR among the divided frequency bands.

According to twenty-fifth to twenty-eighth aspects of the present invention, in the seventeenth, nineteenth, twenty-third and twenty-fourth aspects, respectively, in the pseudo-random number string embedding step, among the MRR, the pseudo-random number string is embedded in a string structured by every or some of coefficients in an HL region, and by every or some of coefficients in an LH region.

According to twenty-ninth to thirty-second aspects of the present invention, in the seventeenth, nineteenth, twenty-third and twenty-fourth aspects, respectively, in the pseudo-random number string embedding step, among the MRR, the pseudo-random number string is embedded in a string structured by every or some of coefficients in either a region high in a horizontal frequency component and low in a vertical frequency component (HL region) or a region low in the horizontal frequency component and high in the vertical frequency component (LH region).

As described above, in the twenty-third to thirty-second aspects, respectively, embedded digital information can be retained even if the information is subjected to processing of cutting high frequency regions such as encoding.

A thirty-third aspect of the present invention is directed to a recording medium on which a program to be run in a computer device is recorded, the program being for realizing in the computer device an operational environment comprising the steps of:

dividing a digital image signal into coefficients in a plurality of frequency bands through discrete wavelet transform or sub-band division;

UNITED STATES PATENT AND TRADEMARK OFFICE
CERTIFICATE OF CORRECTION

PATENT NO. : 6,639,997 B1
DATED : October 28, 2003
INVENTOR(S) : Takashi Katsura et al.

It is certified that error appears in the above-identified patent and that said Letters Patent is hereby corrected as shown below:

Column 1, line 7 to Column 22, line 39 (cont'd), mapping inherent digital information to a pseudo-random number string;
  embedding the pseudo-random number string in a string structured by coefficients in every or some of the divided frequency bands exclusive of a lowest frequency band referred to as MRA (hereinafter, referred to as MRR); and reconstructing the digital image signal in which the pseudo-random number string has been embedded by using the MRR and the MRA to which information embedding processing is subjected.

A thirty-fourth aspect of the present invention is directed to a recording medium on which a program to be run in a computer device is recorded, the program being for realizing an operational environment in the computer device comprising the steps of:

receiving a reconstructed digital image signal obtained by dividing the digital image signal through discrete wavelet transform or sub-band division and by embedding a pseudo-random number string in a string structured by coefficients in every or some of a plurality of frequency bands exclusive of a lowest frequency band referred to as MRA (hereinafter, referred to as MRR), and then dividing the reconstructed digital image signal into coefficients in a plurality of frequency bands through discrete wavelet transform or sub-band transform;

computing an inner product of the string structured by the coefficients in the MRR among the divided frequency bands and a predetermined pseudo-random number assumed to be embedded;

determining the pseudo-random number string embedded in the digital image signal according to the computed inner product; and generating the inherent digital information mapped to the determined pseudo-random number string.

UNITED STATES PATENT AND TRADEMARK OFFICE
CERTIFICATE OF CORRECTION

PATENT NO. : 6,639,997 B1
DATED : October 28, 2003
INVENTOR(S) : Takashi Katsura et al.

It is certified that error appears in the above-identified patent and that said Letters Patent is hereby corrected as shown below:

Column 1, line 7 to Column 22, line 39 (cont'd),

According to thirty-fifth and thirty-sixth aspects of the present invention, in the thirty-third and thirty-fourth aspects, respectively, the pseudo-random number string is structured by numbers selected from normally-distributed average values of "0" and distribution values of "1".

According to thirty-seventh and thirty-eighth aspects, in the thirty-fourth and thirty-sixth aspects, when the computed inner product is larger than a predetermined value, in the pseudo-random number string determination step, pseudo-random number string which embedded in the string structured by the coefficients in the MRR is positively determined as being the pseudo-random number string.

According to thirty-ninth and fortieth aspects, in the thirty-third and thirty-fifth aspects, in the band division step, the digital image signal is divided into a plurality of hierarchies when being divided into coefficients in a plurality of frequency bands, and in the pseudo-random number string embedding step, the pseudo-random number string is embedded in a string structured by every or some of the coefficients in a second or higher hierarchies in the MRR among the divided frequency bands.

According to forty-first to forty-fourth aspects, in the thirty-third, thirty-fifth, thirty-ninth and fortieth aspects, respectively, in the pseudo-random number string embedding step, among the MRR, the pseudo-random number string is embedded in a string structured by every or some of coefficients in an HL region, and by every or some of coefficients in an LH region.

According to a forty-fifth to a forty-eighth aspects, in the thirty-third, thirty-fifth, thirty-ninth and fortieth aspects, respectively, in the pseudo-random number string embedding step, among the MRR, the pseudo-random number string is embedded in a string structured by every or some of coefficients in either an HL region or an LH region.

As described above, the thirty-third to forty-eighth aspects are directed to a recording medium on which a program for carrying out the method of embedding and extracting digital information in the seventeenth to thirty-second aspects is recorded. The recording medium is to provide the method of embedding and extracting digital information in the seventeenth to thirty-second aspects to any existing apparatus as a software.

These and other objects, features, aspects and advantages of the present invention will become more apparent from the following detailed description of the present invention when taken in conjunction with the accompanying drawings.

UNITED STATES PATENT AND TRADEMARK OFFICE
CERTIFICATE OF CORRECTION

PATENT NO. : 6,639,997 B1
DATED : October 28, 2003
INVENTOR(S) : Takashi Katsura et al.

It is certified that error appears in the above-identified patent and that said Letters Patent is hereby corrected as shown below:

Column 1, line 7 to Column 22, line 39 (cont'd),

BRIEF DESCRIPTION OF THE DRAWINGS

FIG. 1 is a block diagram showing the structure of a digital information embedding apparatus 1a according to a first embodiment of the present invention;

FIG. 2 is a block diagram exemplarily showing the detailed structure of a band division portion 11 in FIG. 1;

FIG. 3 is a block diagram exemplarily showing the detailed structure of a first band dividing filter 100 in FIG. 2;

FIG. 4 is a diagram illustrating, in a two-dimensional frequency region, signals subjected to discrete wavelet transform by the band division portion 11 in FIG. 1;

FIG. 5 is a block diagram exemplarily showing the detailed structure of an information embedding portion 13 in FIG. 1;

FIG. 6 is a block diagram exemplarily showing the detailed structure of a band synthesis portion 14 in FIG. 1;

FIG. 7 is a block diagram exemplarily showing the detailed structure of a first band synthesis filter 400 in FIG. 6;

FIG. 8 is a block diagram showing the structure of a digital information extracting apparatus 1b according to a second embodiment of the present invention;

FIG. 9 is a diagram showing the structure of a system in which digital information embedding/extracting program is operated;

FIG. 10 is a block diagram showing the structure of a conventional apparatus for embedding an embedding value; and FIG. 11 is a block diagram showing the structure of a conventional apparatus for extracting an embedding value.

DESCRIPTION OF THE PREFERRED EMBODIMENTS (First Embodiment)

FIG. 1 is a block diagram showing the structure of a digital information embedding apparatus according to a first embodiment of the present invention. In FIG. 1, the digital information embedding apparatus 1a is provided with a band division portion 11, a mapping portion 12, an information embedding portion 13, and a band synthesis portion 14. Hereinafter, it is stepwise described how the digital information embedding apparatus 1a is operated by further referring to FIGS. 2 to 7.

UNITED STATES PATENT AND TRADEMARK OFFICE
CERTIFICATE OF CORRECTION

PATENT NO. : 6,639,997 B1
DATED : October 28, 2003
INVENTOR(S) : Takashi Katsura et al.

It is certified that error appears in the above-identified patent and that said Letters Patent is hereby corrected as shown below:

Column 1, line 7 to Column 22, line 39 (cont'd),

First, by referring to FIGS. 2 to 4, it is described how a signal is subjected to discrete wavelet transform in the band division portion 11. After the transform, a band thereof is hierarchically divided into three. FIG. 2 is a block diagram exemplarily showing the detailed structure of the band division portion 11 in FIG. 1. In FIG. 2, the band division portion 11 is provided with first to third band dividing filters 100, 200 and 300, all of which are equal in structure. By going through each of the first to third band dividing filters 100, 200 and 300, an image signal is divided into four frequency bands, and wavelet coefficients are then determined for every frequency band. Also, as to coefficients, sub-band division will do.

The band division portion 11 first receives a digital image signal 71 in the first band dividing filter 100. Therein, the digital image signal 71 is divided into four signals varied in bands, i.e., an LL1 signal, LH1 signal, HL1 signal, and HH1 signal (hereinafter, referred collectively to as first hierarchical signal) on the basis of parameters of horizontal and vertical frequency components. The second band dividing filter 200 receives only the LL1 signal in the lowest band, and then again divides the signal into four signals varied in bands, i.e., an LL2 signal, LH2 signal, HL2 signal, and HH2 signal (hereinafter, referred collectively to as second hierarchical signal). Then, the third band dividing filter 300 receives only the LL2 signal in the lowest band, and then again divides the signal into four signals varied in bands, i.e., an LL3 signal, LH3 signal, HL3 signal, and HH3 signal (hereinafter, referred collectively to as third hierarchical signal).

FIG. 3 is a block diagram exemplarily showing the detailed structure of the first band dividing filter 100 in FIG. 2. In FIG. 3, the first band dividing filter 100 is provided with first to third two-band division portions 101 to 103. These first to third two-band division portions 101 to 103 are each provided with one-dimensional low-pass filters (LPF) 111 to 113, one-dimensional low-pass filters (LPF) 111 to 113, one-dimensional high-pass filters (HPF) 121 to 123, and down-samplers 131 to 133 and 141 to 143 for decimating the signal at a ratio of 2:1.

The first two-band division portion 101 receives the digital image signal 71, filters any horizontal component thereof through both the LPF 111 and HPF 121, and then outputs two signals. Thereafter, the first two-band division portion 101 decimates the filtered signals at a rate of 2:1, respectively, by using the downsamplers 131 and 141, and then outputs the signals to the next stage. The second two-band division portion 102 receives the signal from the downsampler 131, and then filters any vertical component thereof through both the LPF 112 and HPF 122. Thereafter, the second two-band division portion 102 decimates the filtered signals at a rate of 2:1,

UNITED STATES PATENT AND TRADEMARK OFFICE
CERTIFICATE OF CORRECTION

PATENT NO. : 6,639,997 B1
DATED : October 28, 2003
INVENTOR(S) : Takashi Katsura et al.

It is certified that error appears in the above-identified patent and that said Letters Patent is hereby corrected as shown below:

Column 1, line 7 to Column 22, line 39 (cont'd), respectively, by using the downsamplers 132 and 142, and then outputs two signals as LL1 and LH1. The third two-band division portion 103 receives the signal from the downsampler 141, and then filters any vertical frequency
component thereof through both the LPF 113 and HPF 123. Then, the third two-band division portion 103 decimates the signals at a rate of 2:1, respectively, by using the downsamplers 133 and 143, and then outputs two signals as HL1 and HH1.

In this manner, the first band dividing filter 100 outputs four signals, i.e., the LL1 signal low in both horizontal and vertical components, the LH1 signal low in horizontal but high in vertical, the HL1 signal high in horizontal but low in vertical, and the HH1 signal high in both. The four signals are, in other words, wavelet coefficients. The second and third band dividing filters 200 and 300 treat any incoming signal in a similar manner
to the above.

After going through the first to third band dividing filters 100, 200 and 300, the digital image signal 71 is divided into 10 band signals, i.e., LL3, LH3, HL3, HH3, LH2, HL2, HH2, LH1, HL1, and HH1.

FIG. 4 is a diagram illustrating these ten band signals in a two-dimensional frequency region. In FIG. 4, the vertical axis represents a vertical frequency component, which increases as is directed downward, and the horizontal axis represents a horizontal frequency component, which increases as is directed rightward. Each area in FIG. 4 is data serving as one image, and a ratio of area sizes is equivalent to that of the number of data in the band signals. In detail, in a case where the number of data in the LL3, LH3, HL3, and HH3 being the third hierarchical signals is "1", the number of data in the LH2, HL2 and HH2 being the second hierarchical signals is "4", and the number of data in the LH1, HL1 and HH1 being the first hierarchical signals is "16".

Next, it is described how the mapping portion 12 is operated. The mapping portion 12 generates a pseudo-random number string corresponding to inherent digital information. The

UNITED STATES PATENT AND TRADEMARK OFFICE
CERTIFICATE OF CORRECTION

PATENT NO. : 6,639,997 B1
DATED : October 28, 2003
INVENTOR(S) : Takashi Katsura et al.

It is certified that error appears in the above-identified patent and that said Letters Patent is hereby corrected as shown below:

Column 1, line 7 to Column 22, line 39 (cont'd),

The pseudo-random number string is generated by randomly selecting numbers from a population constituted by normally-distributed average values of "0" and distribution values of "1". It is preferable if the mapping portion 12 is set to select a pseudo-random number string unique to the inherent digital information. Herein, the mapping portion 12 stores a table showing the correspondence between the inherent digital information and the pseudo-random number string. In a case where the inherent digital information is information on a copyright holder including his/her name and the date and time of creation of works, the table shows the correspondence between such information and the pseudo-random number string. The table is structured not to include any identical pseudo-random number string. Accordingly, on receiving any inherent digital information, e.g., information on a copyright holder, the mapping portion 12 refers to the table to output a pseudo-random number string.

Next, by referring to FIG. 5, it is described how the information embedding portion 13 is operated. FIG. 5 is a block diagram exemplarily showing the detailed structure of the information embedding portion 13 in FIG. 1. In FIG. 5, the information embedding portion 13 is provided with an absolute value computation portion 31, a delaying device 32, a multiplier 33, and an adder 34.

The information embedding portion 13 reads the wavelet coefficients of the LH2 signal in FIG. 2 in a predetermined order from MRR of the signal divided in the band division portion 11, and then provides the same to the absolute value computation portion 31 and the delaying device 32. The absolute value computation portion 31 takes an absolute value of the received wavelet coefficients so as to output the same to the multiplier 33. The delaying device 32 has the received wavelet coefficients delayed so as to output the same to the adder 34. On the other hand, the pseudo-random number string $Wi$ outputted from the mapping portion 12 is provided to the multiplier 33. The multiplier 33 multiplies the output of the absolute value computation portion 31 by the pseudo-random number string $Wi$, and then further multiplies the resultant value by the scaling parameter $\alpha$. The adder 34 receives both outputs of the multiplier 33 and the delaying device 32, and then adds the outputs to output. In this example, the above-described processing can be expressed by an equation (7), where $fi$ is the wavelet coefficient, $|fi|$ is the absolute value of $fi$, $Wi$ is the pseudo-random number string outputted from the mapping portion 12, and $fi'$ is the wavelet coefficient subjected to embedment. Note that $\alpha$ herein is an integer smaller than 1.

$$f_i' = f_i + \alpha |f_i| W_i \quad \cdots \quad (7)$$

UNITED STATES PATENT AND TRADEMARK OFFICE
CERTIFICATE OF CORRECTION

PATENT NO. : 6,639,997 B1
DATED : October 28, 2003
INVENTOR(S) : Takashi Katsura et al.

It is certified that error appears in the above-identified patent and that said Letters Patent is hereby corrected as shown below:

Column 1, line 7 to Column 22, line 39 (cont'd),

After the processing subjected to the wavelet coefficients of the LH2 signal is completed, the information embedding portion 13 reads the wavelet coefficients of the LH3 signal in a predetermined order, and then provides the same to the absolute value computation portion 31 and the delaying device 32. Thereafter, the processing is carried out in a similar manner to the wavelet coefficients of the LH2 signal. Note that, although the wavelet coefficients of the LH2 signal are treated before those of the LH3 signal in this example, the order may be inverted. Herein, the order in which the LH2 and LH3 signals are treated and the predetermined order for reading each wavelet coefficients thereof are both key information for extraction. The information is also used to extract inherent digital information.

Next, by referring to FIG. 6, it is described how the band synthesis portion 14 is operated. FIG. 6 is a block diagram exemplarily showing the detailed structure of the band synthesis portion 14 in FIG. 1. In FIG. 6, the band synthesis portion 14 is provided with first to third band synthesis filters 400, 500 and 600, all of which are equal in structure. These first to third band synthesis filters 400, 500 and 600 each receives four signals varied in frequency bands, and then synthesizes the signals to output as one signal.

The first band synthesis filter 400 receives the LL3 signal, HL3 and HH3 signals, and the LH3 signal in which the pseudo-random number string has been embedded, and then synthesizes these signals to generate the LL2 signal. The second band synthesis filter 500 receives the synthesized LL2 signal, the HL2 signal and the HH2 signal, and the LH2 signal in which the pseudo-random number string has been embedded, and then synthesizes these signals to generate the LL1 signal. Thereafter, the third band synthesis filter 600 receives the synthesized LL1 signal, and the HL1 signal, the HH1 signal and the LH1 signal, and then synthesizes these signals to reconstruct the digital image signal 72.

FIG. 7 is a block diagram exemplarily showing the detailed structure of the first band synthesis filter 400 in FIG. 6. In FIG. 7, the first band synthesis filter 400 is provided with first to third two-band synthesis portions 401 to 403. These first to third two-band synthesis portions 401 to 403 are each provided with LPFs 411 to 413, HPFs 421 to 423, and upsamplers 431 to 433 and 441 to 443 for inserting zero to the signal at a ratio of 2:1, and adders 451 to 453.

UNITED STATES PATENT AND TRADEMARK OFFICE
CERTIFICATE OF CORRECTION

PATENT NO. : 6,639,997 B1
DATED : October 28, 2003
INVENTOR(S) : Takashi Katsura et al.

It is certified that error appears in the above-identified patent and that said Letters Patent is hereby corrected as shown below:

Column 1, line 7 to Column 22, line 39 (cont'd),

The first two-band synthesis portion 401 receives the LL3 and LH3 signals, and then converts the signals into signals twice in size (length) by using the upsamplers 431 and 441, respectively. Then, any vertical component of the converted two signals is filtered through the LPF 411 and HPF 421, respectively, and then the filtered two signals are added to output. The second two-band synthesis portion 402 receives the HL3 and HH3 signals, and then converts the two signals into signals twice in size (length) by using the upsamplers 432 and 442. Thereafter, any vertical component of the converted two signals is filtered through the LPF 412 and HPF 422, respectively, and then the filtered two signals are added to output. The third two-band synthesis portion 403 receives outputs from the adders 451 and 452, and then respectively converts the outputs into two signals twice in size (length) by using the upsamplers 433 and 443. Then, any horizontal component of the converted two signals is filtered through the LPF 413 and HPF 423, and then the filtered signals are added to output.

Accordingly, the first band synthesis filter 400 outputs the LL2 signal low in both horizontal and vertical components, which is the second hierarchical signal. Note that, the second and third band synthesis filters 500 and 600 treat any incoming signal similarly to the above.

In such manner, the band synthesis portion 14 reconstructs, before outputting, the ten frequency band signals (LL3, LH1, LH2, LH3, HL1, HL2, HL3, HH1, HH2 and HH3) to the digital image signal 72 to which embedment has already been done.

As is known from the above, according to the digital information embedding apparatus 1a of the first embodiment, a signal is hierarchically divided into three bands, and then each absolute value of the wavelet coefficients of the LH2 and LH3 signals, among MRR, is multiplied by a pseudo-random number string in an arbitrary order. Thereafter, the resultant values are respectively

UNITED STATES PATENT AND TRADEMARK OFFICE
CERTIFICATE OF CORRECTION

PATENT NO. : 6,639,997 B1
DATED : October 28, 2003
INVENTOR(S) : Takashi Katsura et al.

It is certified that error appears in the above-identified patent and that said Letters Patent is hereby corrected as shown below:

Column 1, line 7 to Column 22, line 39 (cont'd), multiplied by a scaling parameter, and then the wavelet coefficients of the LH2 and LH3 signals are added thereto, respectively. Accordingly, the pseudo-random number string is embedded. In this manner, the embedded pseudo-random number string can be retained even if the data is subjected to encoding. It means that inherent digital information corresponding to the pseudo-random number string is retained, and a digital information embedding apparatus can thus be realized in a simple structure.

Discrete wavelet transform performed in the digital information embedding apparatus 1a of the first embodiment is not limited to three hierarchies. The signal can be divided into more hierarchies until the LL signal reaches a 1 by 1 element. Further, bands for embedding are not limited to the LH2 and LH3 signals, but may be arbitrarily selected among MRR or may be MRR in its entirety. If this is the case, the order in which the wavelet coefficients thereof are subjected to processing is arbitrary, but should be determined in advance.

(Second Embodiment)

FIG. 8 is a block diagram showing the structure of a digital information extracting apparatus according to a second embodiment of the present invention. The digital information extracting apparatus 1b of the second embodiment is for extracting the digital information embedded by the digital information embedding apparatus 1a of the first embodiment.

In FIG. 8, the digital information extracting apparatus 1b of the second embodiment is provided with the band division portion 11, a correlation value computation portion 21, a pseudo-random number string determination portion 22, and an information extraction portion 23. The band division portion 11 of the digital information extracting apparatus 1b is structurally the same as the band division portion 11 of the digital information embedding apparatus 1a, and is provided with the same reference numeral not to be described again.

UNITED STATES PATENT AND TRADEMARK OFFICE
CERTIFICATE OF CORRECTION

PATENT NO. : 6,639,997 B1
DATED : October 28, 2003
INVENTOR(S) : Takashi Katsura et al.

It is certified that error appears in the above-identified patent and that said Letters Patent is hereby corrected as shown below:

Column 1, line 7 to Column 22, line 39 (cont'd).

The band division portion 11 receives a digital image signal 73. The digital image signal 73 is the digital image signal 72 outputted from the band synthesis portion 14 of the digital information embedding apparatus 1a, or a signal encoded or decompressed. The band division portion 11 subjects the received digital image signal 73 to discrete wavelet transform to divide the same into ten frequency band signals (LL3, LH1, LH2, LH3, HL1, HL2, HL3, HH1, HH2 and HH3), and computes wavelet coefficients for every signal. Herein, the band division portion 11 outputs, to the correlation value computation portion 21, the wavelet coefficients of the LH2 and LH3 signals, among MRR, in the same order as the first embodiment, i.e., first of the LH2 signal and then of the LH3 signal. The wavelet coefficients thereof are in a string in the same order as the first embodiment. On the other hand, a pseudo-random number string assumed to be embedded in the digital image signal 73 (hereinafter, referred to as assumed pseudo-random number string) is provided to the correlation value computation portion 21. The correlation value computation portion 21 computes an inner product of the string structured by the wavelet coefficients of the LH2 and LH3 signals and the assumed pseudo-random number string, and then divides the value by the length of the assumed pseudo-random number string. The resultant value can be expressed by an equation (8), where $fi^*$ is the wavelet coefficient string structured by the wavelet coefficients of the LH2 and LH3 signals (considered to be slightly different from $fi'$
depending on processing or due to tampering), and $Vi$ is the assumed pseudo-random number string.

$$z = \frac{1}{M} \sum_{i=1}^{M} f_i^* V_i \quad \cdots \quad (8)$$

Herein, $M$ denotes the length of the wavelet coefficient string $fi^*$ and the assumed pseudo-random number string $Vi$. In a case where the digital image signal 73 is 512 pixels by 512 pixels, the maximum value of $M$ is "20480". In the equation (8), when the assumed pseudo-random number string $Vi$ is equal to the pseudo-random number string $Wi$ in the equation (7) ($Vi = Wi$), the value of $z$ will be larger than a case in which they are not equal ($Vi \ne Wi$).

An output of the correlation value computation portion 21 is provided to the pseudo-random number string determination portion 22. The pseudo-random number string determination portion 22 compares a predetermined threshold value with the received output. The threshold value used therein is obtained by an equation (9) next below.

UNITED STATES PATENT AND TRADEMARK OFFICE
CERTIFICATE OF CORRECTION

PATENT NO. : 6,639,997 B1
DATED : October 28, 2003
INVENTOR(S) : Takashi Katsura et al.

It is certified that error appears in the above-identified patent and that said Letters Patent is hereby corrected as shown below:

Column 1, line 7 to Column 22, line 39 (cont'd), $$S_Z = \frac{\alpha}{pM} \sum_{i=1}^{M} |f_i^*| \quad (p \geq 2) \quad \cdots \quad (9)$$

In the equation (9), $\alpha$ is the scaling parameter applied in the first embodiment, and $p$ is an integer equal to or larger than two.

When the output of the correlation value computation portion 21 is larger than the predetermined threshold value, the pseudo-random number string determination portion 22 notifies the information extraction portion 23 that the pseudo-random number string used in the correlation value computation portion 21 (i.e., the wavelet coefficient string structured by the wavelet coefficients of the LH2 and LH3 signals) is positive. In response thereto, with the pseudo-random number string notified as being positive, the information extraction portion 23 extracts inherent digital information mapped thereto. The mapping is done by using the same correspondence table as stored in the mapping portion 12 in the first embodiment. On the other hand, when the output of the correlation value computation portion 21 is smaller than the predetermined threshold value in the pseudo-random number
string determination portion 22, by using the assumed pseudo-random number string, the information extraction portion 23 extracts inherent digital information mapped thereto. Note that, when no assumed pseudo-random number string is determined to be positive enough, the pseudo-random number string determination portion 22 determines that the digital image signal has no pseudo-random number string embedded.

As is known from the above, according to the digital information extracting apparatus 1b of the second embodiment, an inner product of an embedded wavelet coefficient string in a predetermined frequency band and a pseudo-random number string assumed to be embedded by the digital information embedding apparatus 1a is first computed to obtain a correlation value. Thereafter, the correlation value is compared with a predetermined threshold value to determine whether or not the pseudo-random number string is positive, and then inherent digital information is extracted. In this manner, inherent digital information can be extracted through an easy

UNITED STATES PATENT AND TRADEMARK OFFICE
CERTIFICATE OF CORRECTION

PATENT NO. : 6,639,997 B1
DATED : October 28, 2003
INVENTOR(S) : Takashi Katsura et al.

It is certified that error appears in the above-identified patent and that said Letters Patent is hereby corrected as shown below:

Column 1, line 7 to Column 22, line 39 (cont'd), operation. What is better, a third party may have little clue as to the inherent digital information if he/she has no information embedded in a predetermined frequency band. Such information includes, to be more specific, wavelet coefficients in use, an order in which the wavelet coefficients are structured in a string, and the length of a pseudo-random number string.

Note that, the digital information extracting apparatus 1b of the second embodiment obtains a correlation value by dividing an inner product of a wavelet coefficient string in a frequency band and a pseudo-random number string by the length thereof. However, only the inner product is sufficient to obtain a correlation value.

Further, a signal used in the digital information embedding and extracting apparatuses of the first and second embodiments may be a digital image signal, specifically, may be a still image or a moving image. With a moving image signal structured by 30 frames per second, for example, digital information may be embedded in or extracted from every frame or every five frame, for example, in the aforementioned manner.

Typically, the processing executed respectively by the digital information embedding and extracting apparatuses of the first and second embodiments is realized as a computer program (hereinafter, referred to as digital information embedding/extracting program). FIG. 9 is a diagram showing the structure of a system in which the digital information embedding/extracting program is stored in the main storage 52, and is operated under the control of the CPU 51. Various types of provisional data required for the processing is kept in the main storage 52. The table showing the correspondence between the inherent digital information and the pseudo-random number string used in the mapping portion 12 is stored in the recording medium 53. Herein, the digital information embedding/extracting program and the correspondence table may be stored in any location as long as each location can be specified.

While the invention has been described in detail, the foregoing description is in all aspects illustrative and not restrictive. It is understood that numerous other modifications and variations can be devised without departing from the scope of the invention.

UNITED STATES PATENT AND TRADEMARK OFFICE
CERTIFICATE OF CORRECTION

PATENT NO. : 6,639,997 B1
DATED : October 28, 2003
INVENTOR(S) : Takashi Katsura et al.

It is certified that error appears in the above-identified patent and that said Letters Patent is hereby corrected as shown below:

<u>Column 1, line 7 to Column 22, line 39 (cont'd),</u>

WHAT IS CLAIMED IS:

1. A digital information embedding/extracting apparatus of a type embedding inherent digital information in a digital image signal, said apparatus comprising:

a band division means for dividing the digital image signal into coefficients in a plurality of frequency bands through discrete wavelet transform or sub-band division;

a mapping means for mapping the inherent digital information to a pseudo-random number string;

an information embedding means for embedding the pseudo-random number string in a string structured by the coefficients in every or some of the divided frequency bands exclusive of a lowest frequency band referred to as MRA (hereinafter, referred to as MRR); and a band synthesis means for reconstructing the digital image signal in which the pseudo-random number string has been embedded by using the MRR and the MRA to which information embedding processing is subjected.

2. A digital information embedding/extracting apparatus of a type extracting inherent digital information embedded in a digital image signal, said apparatus comprising:

a band division means for receiving a reconstructed digital image signal obtained by dividing the digital image signal through discrete wavelet transform or sub-band division and by embedding a pseudo-random number string in a string structured by coefficients in every or some of a plurality of frequency bands exclusive of a lowest frequency band referred to as MRA (hereinafter, referred to as MRR), and then dividing the reconstructed digital image signal into coefficients in a plurality of frequency bands through discrete wavelet transform or sub-band transform;

a correlation value computation means for computing an inner product of the string structured by the coefficients in the MRR among the divided frequency bands and a predetermined pseudo-random number assumed to be embedded;

a pseudo-random number string determination means for determining the pseudo-random number string embedded in the digital image signal according to the value computed by said correlation value computation means; and an information extraction means for extracting the inherent digital information mapped to the determined pseudo-random number string.

3. The digital information embedding/extracting apparatus as claimed in claim 1, wherein the pseudo-random number string is structured by numbers selected from normally-distributed average values of "0" and distribution values of "1".

UNITED STATES PATENT AND TRADEMARK OFFICE
CERTIFICATE OF CORRECTION

PATENT NO. : 6,639,997 B1
DATED : October 28, 2003
INVENTOR(S) : Takashi Katsura et al.

It is certified that error appears in the above-identified patent and that said Letters Patent is hereby corrected as shown below:

<u>Column 1, line 7 to Column 22, line 39 (cont'd),</u>

4. The digital information embedding/extracting apparatus as claimed in claim 2, wherein the pseudo-random number string is structured by numbers selected from normally-distributed average values of "0" and distribution values of "1".

5. The digital information embedding/extracting apparatus as claimed in claim 2, wherein, when the value computed by said correlation value computation means is larger than a predetermined value, said pseudo-random number string determination means determines that a pseudo-random number string which is embedded in the string structured by the coefficients in the MRR is positively identified as being the pseudo-random number string.

6. The digital information embedding/extracting apparatus as claimed in claim 4, wherein, when the value computed by said correlation value computation means is larger than a predetermined value, said pseudo-random number string determination means determines that a pseudo-random number string which is embedded in the string structured by the coefficients in the MRR is positively identified as being the pseudo-random number string.

7. The digital information embedding/extracting apparatus as claimed in claim 1, wherein, on dividing the digital image signal into the coefficients in the plurality of frequency bands, said band division means divides the digital image signal into a plurality of hierarchies; and said <u>information embedding means embeds the pseudo-random number string in a string structured by</u> every or some of the coefficients in a second or higher hierarchies in the MRR among the divided frequency bands.

8. The digital information embedding/extracting apparatus as claimed in claim 3, wherein, on dividing the digital image signal into the coefficients in the plurality of frequency bands, said band division means divides the digital image signal into a plurality of hierarchies; and said information embedding means embeds the pseudo-random number string in a string structured by every or some of the coefficients in a second or higher hierarchies in the MRR among the divided frequency bands.

9. The digital information embedding/extracting apparatus as claimed in claim 1, wherein, among the MRR, said information embedding means embeds the pseudo-random number string in a string structured by every or some of coefficients in a region high in a horizontal frequency component and low in a vertical frequency component (HL region), and by every or some of coefficients in a region low in the horizontal frequency component and high in the vertical frequency component (LH region).

UNITED STATES PATENT AND TRADEMARK OFFICE
CERTIFICATE OF CORRECTION

PATENT NO. : 6,639,997 B1
DATED : October 28, 2003
INVENTOR(S) : Takashi Katsura et al.

It is certified that error appears in the above-identified patent and that said Letters Patent is hereby corrected as shown below:

Column 1, line 7 to Column 22, line 39 (cont'd),

10. The digital information embedding/extracting apparatus as claimed in claim 3, wherein, among the MRR, said information embedding means embeds the pseudo-random number string in a string structured by every or some of coefficients in a region high in a horizontal frequency component and low in a vertical frequency component (HL region), and by every or some of coefficients in a region low in the horizontal frequency component and high in the vertical frequency component (LH region).

11. The digital information embedding/extracting apparatus as claimed in claim 7, wherein, among the MRR, said information embedding means embeds the pseudo-random number string in a string structured by every or some of coefficients in a region high in a horizontal frequency component and low in a vertical frequency component (HL region), and by every or some of coefficients in a region low in the horizontal frequency component and high in the vertical frequency component (LH region).

12. The digital information embedding/extracting apparatus as claimed in claim 8, wherein, among the MRR, said information embedding means embeds the pseudo-random number string in a string structured by every or some of coefficients in a region high in a horizontal frequency component and low in a vertical frequency component (HL region), and by every or some of coefficients in a region low in the horizontal frequency component and high in the vertical frequency component (LH region).

13. (Amended) The digital information embedding/extracting apparatus as claimed in claim 1, wherein, among the MRR, said information embedding means embeds the pseudo-random number string in a string structured by every or some of coefficients in either a region high in a horizontal frequency component and low in a vertical frequency component (HL region) or a region low in the horizontal frequency component and high in the vertical frequency component (LH region).

14. The digital information embedding/extracting apparatus as claimed in claim 3, wherein, among the MRR, said information embedding means embeds the pseudo-random number string in a string structured by every or some of coefficients in either a region high in a horizontal frequency component and low in a vertical frequency component (HL region) or a region low in the horizontal frequency component and high in the vertical frequency component (LH region).

UNITED STATES PATENT AND TRADEMARK OFFICE
CERTIFICATE OF CORRECTION

PATENT NO. : 6,639,997 B1
DATED : October 28, 2003
INVENTOR(S) : Takashi Katsura et al.

It is certified that error appears in the above-identified patent and that said Letters Patent is hereby corrected as shown below:

Column 1, line 7 to Column 22, line 39 (cont'd),

15. The digital information embedding/extracting apparatus as claimed in claim 7, wherein, among the MRR, said information embedding means embeds the pseudo-random number string in a string structured by every or some of coefficients in either a region high in a horizontal frequency component and low in a vertical frequency component (HL region) or a region low in the horizontal frequency component and high in the vertical frequency component (LH region).

16. The digital information embedding/extracting apparatus as claimed in claim 8, wherein, among the MRR, said information embedding means embeds the pseudo-random number string in a string structured by every or some of coefficients in either a region high in a horizontal frequency component and low in a vertical frequency component (HL region) or a region low in the horizontal frequency component and high in the vertical frequency component (LH region).

17. A method of embedding/extracting digital information of a type embedding inherent digital information in a digital image signal, said method comprising:

dividing the digital image signal into coefficients in a plurality of frequency bands through discrete wavelet transform or sub-band division;

mapping the inherent digital information to a pseudo-random number string;

embedding the pseudo-random number string in a string structured by the coefficients in every or some of the divided frequency bands exclusive of a lowest frequency band referred to as MRA (hereinafter, referred to as MRR); and reconstructing the digital image signal in which the pseudo-random number string has been embedded by using the MRR and the MRA to which information embedding processing is subjected.

18. A method of embedding/extracting digital information of a type extracting inherent digital information embedded in a digital image signal, the method comprising:

receiving a reconstructed digital image signal obtained by dividing the digital image signal through discrete wavelet transform or sub-band division and by embedding a pseudo-random

UNITED STATES PATENT AND TRADEMARK OFFICE
CERTIFICATE OF CORRECTION

PATENT NO.     : 6,639,997 B1
DATED          : October 28, 2003
INVENTOR(S)    : Takashi Katsura et al.

It is certified that error appears in the above-identified patent and that said Letters Patent is hereby corrected as shown below:

Column 1, line 7 to Column 22, line 39 (cont'd), number string in a string structured by coefficients in every or some of a plurality of frequency bands exclusive of a lowest frequency band referred to as MRA (hereinafter, referred to as MRR), and then dividing the reconstructed digital image signal into coefficients in a plurality of frequency bands through discrete wavelet transform or sub-band transform;

computing an inner product of the string structured by the coefficients in the MRR among the divided frequency bands and a predetermined pseudo-random number assumed to be embedded;

determining the pseudo-random number string embedded in the digital image signal according to the computed inner product; and generating the inherent digital information mapped to the determined pseudo-random number string.

19. The method of embedding/extracting digital information as claimed in claim 17, wherein the pseudo-random number string is structured by numbers selected from normally-distributed average values of "0" and distribution values of "1".

20. The method of embedding/extracting digital information as claimed in claim 18, wherein the pseudo-random number string is structured by numbers selected from normally-distributed average values of "0" and distribution values of "1".

21. The method of embedding/extracting digital information as claimed in claim 18, wherein, when the computed inner product is larger than a predetermined value, in said determining the pseudo-random number string, a pseudo-random number string which is embedded in the string structured by the coefficients in the MRR is positively determined as being the pseudo-random number string.

22. The method of embedding/extracting digital information as claimed in claim 20, wherein, when the computed inner product is larger than a predetermined value, in said determining pseudo-random number string, a pseudo-random number string which is embedded in the string structured by the coefficients in the MRR is positively determined as being the pseudo-random number string.

23. The method of embedding/extracting digital information as claimed in claim 17, wherein, in said band division, the digital image signal is divided into a plurality of hierarchies when being divided into coefficients in a plurality of frequency bands; and in said embedding the pseudo-random number string, the pseudo-random number string is embedded in a string structured by every or some of the coefficients in a second or higher hierarchies in the MRR among the divided frequency bands.

24. (Amended) The method of embedding/extracting digital information as claimed in claim 19, wherein, in said band division, the digital image signal is divided into a plurality of

UNITED STATES PATENT AND TRADEMARK OFFICE
CERTIFICATE OF CORRECTION

PATENT NO. : 6,639,997 B1
DATED : October 28, 2003
INVENTOR(S) : Takashi Katsura et al.

It is certified that error appears in the above-identified patent and that said Letters Patent is hereby corrected as shown below:

<u>Column 1, line 7 to Column 22, line 39 (cont'd),</u> hierarchies when being divided into coefficients in a plurality of frequency bands; and in said embedding the pseudo-random number string, the pseudo-random number string is embedded in a string structured by every or some of the coefficients in a second or higher hierarchies in the MRR among the divided frequency bands.

25. The method of embedding/extracting digital information as claimed in claim 17, wherein, in said embedding the pseudo-random number string, among the MRR, the pseudo-random number string is embedded in a string structured by every or some of coefficients in a region high in a horizontal frequency component and low in a vertical frequency component (HL region), and by every or some of coefficients in a region low in the horizontal frequency component and high in the vertical frequency component (LH region).

26. The method of embedding/extracting digital information as claimed in claim 19, wherein, in said embedding the pseudo-random number string, among the MRR, the pseudo-random number string is embedded in a string structured by every or some of coefficients in a region high in a horizontal frequency component and low in a vertical frequency component (HL region), and by every or some of coefficients in a region low in the horizontal frequency component and high in the vertical frequency component (LH region).

27. The method of embedding/extracting digital information as claimed in claim 23, wherein, in said embedding the pseudo-random number string, among the MRR, the pseudo-random number string is embedded in a string structured by every or some of coefficients in a region high in a horizontal frequency component and low in a vertical frequency component (HL region), and by every or some of coefficients in a region low in the horizontal frequency component and high in the vertical frequency component (LH region).

28. The method of embedding/extracting digital information as claimed in claim 24, wherein, in said embedding the pseudo-random number string, among the MRR, the pseudo-random number string is embedded in a string structured by every or some of coefficients in a region high in a horizontal frequency component and low in a vertical frequency component (HL region), and by every or some of coefficients in a region low in the horizontal frequency component and high in the vertical frequency component (LH region).

29. The method of embedding/extracting digital information as claimed in claim 17, wherein, in said embedding the pseudo-random number string, among the MRR, the pseudo-random number string is embedded in a string structured by every or some of coefficients in either a region high in a horizontal frequency component and low in a vertical frequency component (HL region) or a region low in the horizontal frequency component and high in the vertical frequency component (LH region).

UNITED STATES PATENT AND TRADEMARK OFFICE
CERTIFICATE OF CORRECTION

PATENT NO.    : 6,639,997 B1
DATED         : October 28, 2003
INVENTOR(S)   : Takashi Katsura et al.

It is certified that error appears in the above-identified patent and that said Letters Patent is hereby corrected as shown below:

Column 1, line 7 to Column 22, line 39 (cont'd),

30. The method of embedding/extracting digital information as claimed in claim 19, wherein, in said embedding the pseudo-random number string, among the MRR, the pseudo-random number string is embedded in a string structured by every or some of coefficients in either a region high in a horizontal frequency component and low in a vertical frequency component (HL region) or a region low in the horizontal frequency component and high in the vertical frequency component (LH region).

31. The method of embedding/extracting digital information as claimed in claim 23, wherein, in said embedding the pseudo-random number string, among the MRR, the pseudo-random number string is embedded in a string structured by every or some of coefficients in either a region high in a horizontal frequency component and low in a vertical frequency component (HL region) or a region low in the horizontal frequency component and high in the vertical frequency component (LH region).

32. The method of embedding/extracting digital information as claimed in claim 24, wherein, in said embedding the pseudo-random number string, among the MRR, the pseudo-random number string is embedded in a string structured by every or some of coefficients in either a region high in a horizontal frequency component and low in a vertical frequency component (HL region) or a region low in the horizontal frequency component and high in the vertical frequency frequency component (LH region).

33. A recording medium on which a program to be run in a computer device is recorded, the program being for realizing an operational environment in the computer device comprising:

dividing a digital image signal into coefficients in a plurality of frequency bands through discrete wavelet transform or sub-band division;

mapping inherent digital information to a pseudo-random number string;

embedding the pseudo-random number string in a string structured by transform the coefficients in every or some of the divided frequency bands exclusive of a lowest frequency band referred to as MRA (hereinafter, referred to as MRR); and reconstructing the digital image signal in which the pseudo-random number string has been embedded by using the MRR and the MRA to which information embedding processing is subjected.

34. A recording medium on which a program to be run in a computer device is recorded, the program being for realizing an operational environment in the computer device comprising:

receiving a reconstructed digital image signal obtained by dividing the digital image signal through discrete wavelet transform or sub-band division and by embedding a pseudo-random number string in a string structured by coefficients in every or some of a plurality of frequency bands exclusive of a lowest frequency band referred to as MRA (hereinafter, referred to as MRR),

UNITED STATES PATENT AND TRADEMARK OFFICE
CERTIFICATE OF CORRECTION

PATENT NO. : 6,639,997 B1
DATED : October 28, 2003
INVENTOR(S) : Takashi Katsura et al.

It is certified that error appears in the above-identified patent and that said Letters Patent is hereby corrected as shown below:

<u>Column 1, line 7 to Column 22, line 39 (cont'd),</u>
and then dividing the reconstructed digital image signal into coefficients in a plurality of frequency bands through discrete wavelet transform or sub-band transform;

computing an inner product of the string structured by the coefficients in the MRR among the divided frequency bands and a predetermined pseudo-random number assumed to be embedded;

determining the pseudo-random number string embedded in the digital image signal according to the computed inner product; and generating the inherent digital information mapped to the determined pseudo-random number string.

35. The recording medium as claimed in claim 33, wherein the pseudo-random number string is structured by numbers selected from normally-distributed average values of "0" and distribution values of "1".

36. The recording medium as claimed in claim 34, wherein the pseudo-random number string is structured by numbers selected from normally-distributed average values of "0" and distribution values of "1".

37. The recording medium as claimed in claim 34, wherein, when the computed inner product is larger than a predetermined value, in said determining the pseudo-random number string, a pseudo-random number string which is embedded in the string structured by the coefficients in the MRR is positively determined as being the pseudo-random number string.

38. The recording medium as claimed in claim 36, wherein, when the computed inner product is larger than a predetermined value, in said determining the pseudo-random number string, a pseudo-random number string which is embedded in the string structured by the coefficients in the MRR is positively determined as being the pseudo-random number string.

39. The recording medium as claimed in claim 33, wherein, in said band division, the digital image signal is divided into a plurality of hierarchies when being divided into coefficients in a plurality of frequency bands; and in said embedding the pseudo-random number string, the pseudo-random number string is embedded in a string structured by every or some of the coefficients in a second or higher hierarchies in the MRR among the divided frequency bands.

40. The recording medium as claimed in claim 35, wherein, in said band division, the digital image signal is divided into a plurality of hierarchies when being divided into coefficients in a plurality of frequency bands; and in said embedding the pseudo-random number string, the pseudo-random number string is embedded in a string structured by every or some of the coefficients in a second or higher hierarchies in the MRR among the divided frequency bands.

UNITED STATES PATENT AND TRADEMARK OFFICE
CERTIFICATE OF CORRECTION

PATENT NO. : 6,639,997 B1
DATED : October 28, 2003
INVENTOR(S) : Takashi Katsura et al.

It is certified that error appears in the above-identified patent and that said Letters Patent is hereby corrected as shown below:

Column 1, line 7 to Column 22, line 39 (cont'd),

41. The recording medium as claimed in claim 33, wherein, in said embedding the pseudo-random number string, among the MRR, the pseudo-random number string is embedded in a string structured by every or some of coefficients in a region high in a horizontal frequency component and low in a vertical frequency component (HL region), and by every or some of coefficients in a region low in the horizontal frequency component and high in the vertical frequency component (LH region).

42. The recording medium as claimed in claim 35, wherein, in said embedding the pseudo-random number string, among the MRR, the pseudo-random number string is embedded in a string structured by every or some of coefficients in a region high in a horizontal frequency component and low in a vertical frequency component (HL region), and by every or some of coefficients in a region low in the horizontal frequency component and high in the vertical frequency component (LH region).

43. The recording medium as claimed in claim 39, wherein, in said embedding the pseudo-random number string, among the MRR, the pseudo-random number string is embedded in a string structured by every or some of coefficients in a region high in a horizontal frequency component and low in a vertical frequency component (HL region), and by every or some of coefficients in a region low in the horizontal frequency component and high in the vertical frequency component (LH region).

44. The recording medium as claimed in claim 40, wherein, in said embedding the pseudo-random number string, among the MRR, the pseudo-random number string is embedded in a string structured by every or some of coefficients in a region high in a horizontal frequency component and low in a vertical frequency component (HL region), and by every or some of coefficients in a region low in the horizontal frequency component and high in the vertical frequency component (LH region).

45. The recording medium as claimed in claim 33, wherein, in said embedding the pseudo-random number string, among the MRR, the pseudo-random number string is embedded in a string structured by every or some of coefficients in either a region high in a horizontal frequency component and low in a vertical frequency component (HL region) or a region low in the horizontal frequency component and high in the vertical frequency component (LH region).

46. The recording medium as claimed in claim 35, wherein, in said embedding the pseudo-random number string , among the MRR, the pseudo-random number string is embedded in a string structured by every or some of coefficients in either a region high in a horizontal frequency component and low in a vertical frequency component (HL region) or a region low in the horizontal

UNITED STATES PATENT AND TRADEMARK OFFICE
CERTIFICATE OF CORRECTION

PATENT NO. : 6,639,997 B1
DATED : October 28, 2003
INVENTOR(S) : Takashi Katsura et al.

It is certified that error appears in the above-identified patent and that said Letters Patent is hereby corrected as shown below:

<u>Column 1, line 7 to Column 22, line 39 (cont'd),</u> frequency component and high in the vertical frequency component (LH region).

47. The recording medium as claimed in claim 39, wherein, in said embedding the pseudo-random number string, among the MRR, the pseudo-random number string is embedded in a string structured by every or some of coefficients in either a region high in a horizontal frequency component and low in a vertical frequency component (HL region) or a region low in the horizontal frequency component and high in the vertical frequency component (LH region).

48. The recording medium as claimed in claim 40, wherein, in said embedding the pseudo-random number string, among the MRR, the pseudo-random number string is embedded in a string structured by every or some of coefficients in either a region high in a horizontal frequency component and low in a vertical frequency component (HL region) or a region low in the horizontal frequency component and high in the vertical frequency component (LH region).

Signed and Sealed this

Eleventh Day of May, 2004

JON W. DUDAS
*Acting Director of the United States Patent and Trademark Office*